United States Patent
Berzin

(10) Patent No.: US 12,192,058 B2
(45) Date of Patent: Jan. 7, 2025

(54) DEEP NETWORK SLICING WITH VIRTUALIZED PROGRAMMABLE DATA-PLANE PIPELINES

(71) Applicant: EQUINIX, INC., Redwood City, CA (US)

(72) Inventor: Oleg Berzin, Huntington Valley, PA (US)

(73) Assignee: EQUINIX INC., Redwood City, CA (US)

( * ) Notice: Subject to any disclaimer, the term of this patent is extended or adjusted under 35 U.S.C. 154(b) by 359 days.

(21) Appl. No.: 17/878,343

(22) Filed: Aug. 1, 2022

(65) Prior Publication Data

US 2024/0039792 A1 Feb. 1, 2024

(51) Int. Cl.
| | |
|---|---|
| *H04W 48/18* | (2009.01) |
| *H04L 41/0895* | (2022.01) |
| *H04L 67/60* | (2022.01) |
| *H04W 4/50* | (2018.01) |

(52) U.S. Cl.
CPC .......... *H04L 41/0895* (2022.05); *H04L 67/60* (2022.05); *H04W 4/50* (2018.02); *H04W 48/18* (2013.01)

(58) Field of Classification Search
CPC .... H04W 48/18; H04W 4/50; H04L 41/0893; H04L 41/0895
See application file for complete search history.

(56) References Cited

U.S. PATENT DOCUMENTS

| | | | |
|---|---|---|---|
| 10,498,659 B2 * | 12/2019 | Bull | H04W 16/14 |
| 2018/0013680 A1 * | 1/2018 | Bull | H04W 72/1268 |
| 2021/0297891 A1 | 9/2021 | Berzin et al. | |
| 2021/0297925 A1 | 9/2021 | Berzin et al. | |
| 2022/0014947 A1 * | 1/2022 | Smith | H04W 24/04 |
| 2022/0078590 A1 * | 3/2022 | Gundavelli | H04W 76/10 |
| 2022/0225227 A1 * | 7/2022 | Jha | H04W 24/04 |
| 2023/0337121 A1 * | 10/2023 | Li | H04W 48/18 |

\* cited by examiner

*Primary Examiner* — Kevin Kim
(74) *Attorney, Agent, or Firm* — Neugeboren O'Dowd PC

(57) ABSTRACT

This disclosure describes systems, methods, and apparatus for network slicing with programmable data-plane pipelines, comprising creating slice contexts, where creating the slice contexts comprises creating control-plane and data-plane data for each of a plurality of network slices, and storing the control-plane and the data-plane data to produce slice contexts, mapping resources of network switch hardware to the slice contexts to create a resource mapping, instantiating the plurality of network slices on the network switch hardware using the resource mapping, receiving frames from one or more external sources, identifying a network slice corresponding to each frame, and enriching a header of each of the frames, based upon the identification of the network slice for each frame, to direct each frame to a data-plane pipeline.

20 Claims, 12 Drawing Sheets

DEEP NETWORK SLICING WITH VIRTUALIZED PROGRAMMABLE DATA-PLANE PIPELINES

FIELD OF THE DISCLOSURE

The present disclosure relates generally to network slicing. In particular, but not by way of limitation, the present disclosure relates to systems, methods and apparatuses for deep network slicing with virtualized programmable data-plane pipelines.

DESCRIPTION OF RELATED ART

Traditional networking devices implement specific data-plane pipeline operations that are "hardwired" in the design of the switching application-specific integrated circuit (ASIC). In some circumstances, if a change in the data-pipeline capabilities is required, the ASIC itself must be re-engineered and replaced. Furthermore, in some cases, the network devices are only capable of providing a set of specific (e.g., network layer) functions, due to the way the data-pipelines are implemented. If other functions are required or modifications to existing functions are needed, they are typically added as external functions (i.e., with respect to the networking system in question). In such cases, the end-to-end traffic is said to "trombone" through the collection of externally implemented functions. In other words, the end-to-end traffic traverses the networking box/fabric multiple times. In some circumstances, such a design leads to inefficiencies. To overcome said inefficiencies, currently used techniques often over provision the network, which not only adds to both costs and complexity, but may also adversely impact the operability and reliability of the network.

The description provided in the Description of Related Art section should not be assumed to be prior art merely because it is mentioned in or associated with this section. The Description of Related Art section may include information that describes one or more aspects of the subject technology.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some aspects of the disclosure may be characterized as a method for network slicing with programmable data-plane pipelines, the method comprising creating slice contexts, where creating the slice contexts comprises creating control-plane data for each of a plurality of network slices, creating data-plane data for each of the plurality of network slices, and storing the control-plane data and the data-plane data for each of the plurality of network slices to produce slice contexts. In some implementations, the method further comprises mapping resources of network switch hardware to the slice contexts to create a resource mapping for the slice contexts, instantiating the plurality of network slices on the network switch hardware using the resource mapping, receiving frames from one or more external sources, identifying a network slice corresponding to each frame, and enriching a header of each of the frames, based upon the identification of the network slice for each frame, to direct each frame to a data-plane pipeline.

Other aspects of the disclosure may also be characterized as a system configured for network slicing with programmable data-plane pipelines, comprising network switch hardware, and one or more hardware processors configured by machine-readable instructions to create slice contexts, where creating the slice contexts comprises creating control-plane data for each of a plurality of network slices, creating data-plane data for each of the plurality of network slices, and storing the control-plane data and the data-plane data for each of the plurality of network slices to produce slice contexts. In some implementations, the one or more hardware processors are further configured by machine-readable instructions to map resources of the network switch hardware to the slice contexts to create a resource mapping for the slice contexts, instantiate the plurality of network slices on the network switch hardware using the resource mapping, receive frames from one or more external sources, identify a network slice corresponding to each frame, and enrich a header of each of the frames, based upon the identification of the network slice for each frame, to direct each frame to a data-plane pipeline.

Yet other aspects of the disclosure can be characterized as non-transitory, tangible processor readable storage medium, encoded with processor readable instructions to perform a method for network slicing with programmable data-plane pipelines, the method comprising creating slice contexts, where creating the slice contexts comprises creating control-plane data for each of a plurality of network slices, creating data-plane data for each of the plurality of network slices, and storing the control-plane data and the data-plane data for each of the plurality of network slices to produce slice contexts. In some implementations of the non-transitory, tangible processor readable storage medium, the method further comprises mapping resources of network switch hardware to the slice contexts to create a resource mapping for the slice contexts, instantiating the plurality of network slices on the network switch hardware using the resource mapping, receiving frames from one or more external sources, identifying a network slice corresponding to each frame, and enriching a header of each of the frames, based upon the identification of the network slice for each frame, to direct each frame to a data-plane pipeline.

In some examples of the method, system, and non-transitory, tangible processor readable storage medium described above, the mapping of resources comprises allocating resources utilizing direct partitioning of network switch hardware.

In some examples of the method, system, and non-transitory, tangible processor readable storage medium described above, the mapping of resources comprises allocating resources utilizing a slicer visor abstraction layer.

In some examples of the method, system, and non-transitory, tangible processor readable storage medium described above, the mapping of resources comprises tailoring the mapping to specific network switch hardware based upon specified requirements.

Some examples of the method, system, and non-transitory, tangible processor readable storage medium described above may further include processes, features, means, or instructions for receiving network slice requirements from a 5G control plane, where the creation of control-plane data and data-plane data is based upon the network slice requirements received from the 5G control plane to create a slice context defined by the 5G control plane.

In some examples of the method, system, and non-transitory, tangible processor readable storage medium described above, the creation of control-plane data and data-plane data produces a slice context with capabilities beyond a 5G network.

In some examples of the method, system, and non-transitory, tangible processor readable storage medium described above, instantiating the plurality of network slices on the network switch hardware comprises programming the network switch hardware based upon a type of slice defined by the data-plane data. Some examples of the method, system, and non-transitory, tangible processor readable storage medium described above may further include processes, features, means, or instructions for triggering packet processing actions based on slice types.

In some examples of the method, system, and non-transitory, tangible processor readable storage medium described above, each of the data-plane pipelines comprises a slice-specific data-plane processing pipeline. In some examples of the method, system, and non-transitory, tangible processor readable storage medium described above, each slice context is associated with a data plane program corresponding to one or more network slice requirements for a respective network slice.

In some examples of the method, system, and non-transitory, tangible processor readable storage medium described above, the one or more network slice requirements comprise one or more of security, 5G traffic processing, 5G capability, 5G proximity to access networks, and storage.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
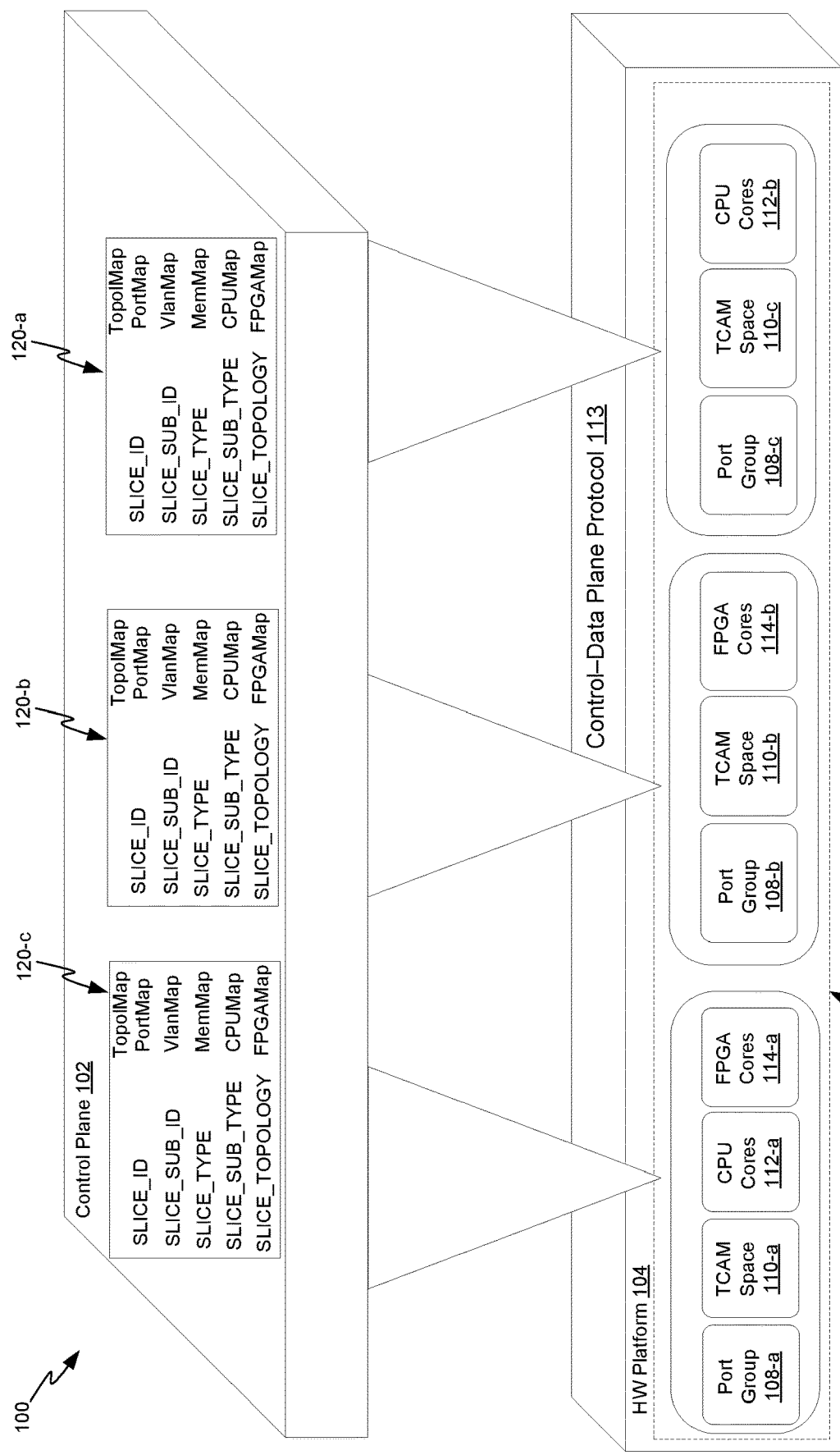
FIG. 1 illustrates a block diagram depicting an example of slice contexts at a control plane and network hardware, in accordance with various aspects of the present disclosure.

The present disclosure relates generally to network slicing. In particular, but not by way of limitation, the present disclosure relates to systems, methods and apparatuses for network slicing with virtualized programmable data-plane pipelines.

As used herein, the terms "data plane", "data-plane", or "dataplane" may be used interchangeably throughout the disclosure and may be defined as a set of functions that enable packet or frame delivery through a network device, for example, from an input interface to an output interface, while making use of the device functions such as memory and input/output controller (i.e., I/O controller). Furthermore, the term "pipeline" is used to reflect a specific part of the data-plane that is responsible for packet processing. In some examples, the use of a pipeline (also referred to as a data-plane pipeline) may encompass the use of one or more device functions, such as a network processor, and/or enable operations on a packet, such as, but not limited to, forwarding lookup, header modifications, and insertion/removal of additional headers and metadata. In some examples, a pipeline may be implemented as a sequence of stages or operations on the packet (e.g., data packet) that is being processed. As such, the terms "data-plane" and "pipeline" may be combined and understood to be a set of functions of a network device that enable packet delivery and processing.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device" is not meant to be limiting to a single such device. It is contemplated that numerous devices may comprise a single "device" as described herein.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Traffic "Tromboning"

As noted above, currently used networking devices often implement specific data-plane pipeline operations that are "hardwired" in the design of the switching application-specific integrated circuit (ASIC). Additionally, if a change in the data-pipeline capabilities is required, the ASIC itself may need to be re-engineered and/or replaced. In some circumstances, the network devices are limited in terms of the functions (e.g., network layer functions) that they can support, which may be due to the implementation specifics of the data-pipelines. If other functions are required or modifications to existing functions are needed, they are typically added as external functions (i.e., with respect to the networking system in question). In such cases, the end-to-end traffic is said to "trombone" through the collection of externally implemented functions. In other words, the end-to-end traffic traverses the networking box/fabric multiple times, leading to inefficiencies. To overcome said inefficiencies, currently used techniques often over provision the network. Complexity and cost considerations aside, such a design may also adversely impact the operability and/or reliability of the network.

Programmability

In some cases, programmable data or user-plane pipelines enable external functions (e.g., functions that exist outside the network fabric) to be implemented within a network fabric. These programmable pipelines may be supported by the ASICs themselves and implemented as microcode executed on the ASIC (also referred to as "chip") and described through programmable languages, such as, but not limited to, P4. In this way, a new data-plane may be compiled and run within the networking box/fabric. Furthermore, the new data-plane may allow for additional processing capabilities that go beyond the traditional network layer (e.g., Firewall, Load Balancer, Network Address Translation or NAT, etc.). Said another way, programmable data-plane pipelines may serve to reduce or eliminate traffic "tromboning," as seen in the prior art.

Network Virtualization

As used herein, the term "network virtualization" may refer to the sharing of the same physical resources (e.g., network ports, address memory) across multiple consumers (or tenants) of said resources, while allowing for some degree of independence of operation and/or isolation between tenants. Some non-limiting examples of network virtualization include Virtual Local Area Network (VLAN), Virtual eXtensible LAN (VxLAN), Tunnels (e.g., IP over IP tunnel or IPIP, Generic Routing Encapsulation or GRE, multiple protocol label switching or MPLS), and Virtual Routing and Forwarding (VRF). One or more of these network virtualization techniques may support tenant isolation and/or reuse of one or more network resources (e.g., L2/L3 address spaces). In some cases, the base-level network virtualization described above may also be referred to as overlay networking.

In some cases, network virtualization may be implemented using virtual network functions (VNFs). With VNFs, one or more networking stacks for one or more network devices (e.g., routers, switches, or any other applicable network device, such as a Firewall or a Load Balancer) may be implemented in a virtual machine (VM). In some examples, the VM may be executed on a computing system (e.g., computing system 600, 1100) with hardware and/or software resources, such as CPU memory, network interfaces, etc., where the VM (or the computing system) may be managed via a hypervisor. In some cases, virtual switching (e.g., LINUX BRIDGE, vSwitch) may be used for the communication between VNFs, for example, if the communicating VNFs are executed on the same host. Alternatively, one or more of virtual switching, physical network devices, and overlay networking may be utilized if the communicating VNFs are executed on different computing hosts. In some circumstances, traffic forwarding efficiency may be adversely affected due to the overhead associated with overlay networking, where the overhead may extend all the way through the hypervisor and/or virtual switching on the computing hosts.

As used herein, the term "cloud native network functions (CNFs)" refers to virtual network functions that may be implemented in containers, i.e., in lieu of VMs. In some examples, CNFs may enhance network traffic efficiency by (1) eliminating the overhead related to the use of a hypervisor by VNFs, (2) enabling the use of a trimmed down software stack, e.g., as a result of elimination of the full Operating System (OS) used by VMs, and/or sharing of the LINUX KERNEL by multiple containers, to name a few non-limiting examples. While not necessary, in some cases, the containers may appear as processes to the host OS. In some instances, CNFs may be implemented on computer nodes, and may require some form of overlay networking for communication. Similar to the other examples of network virtualization described above, traffic forwarding efficiency may be adversely impacted when CNFs run on different computing hosts and/or communicate across a physical network.

Disaggregated CNFs with Data-Plane Offloading

In the above discussion on VNFs and CNFs, the assumed basic behavior of network functions is that they implement both the control and the data/user-plane (sometimes also referred to as forwarding plane) capabilities. In other words, the VNF/CNF is responsible for both knowing where to direct traffic and how to process the packets/frames. In general, disaggregation refers to separation (and the subsequent cooperation) between different networking functions. Additionally, or alternatively, disaggregation refers to the separation between networking hardware and operating software. In the context of virtual networking, disaggregation may also refer to the separation between the software stacks responsible for control and signaling tasks and those used for traffic forwarding tasks. This could be thought of as a functional split between a controller (implemented in software) and a forwarder. The forwarder may be implemented in hardware, software, or a combination thereof. For instance, the forwarder may be implemented on hardware with an adaptation software layer to enable co-operation and communication between the controller and the forwarder. In some examples, the adaptation software layer comprises a software component that is employed to control and configure the programmable data plane of the forwarder. Additionally, or alternatively, the adaptation software layer is configured to be controlled by an external software-defined network (SDN) controller and/or a control plane component of a virtualized network function. In some examples, the SDN controller may use protocols, such as, but not limited to, Border Gateway Protocol (BGP) or Google Remote Procedure Call (gRPC), to communicate control and signaling information to the adaptation software layer (e.g., flow entry, packet filter entry), which in turn will use specific APIs or commands to program the switching hardware.

In some circumstances, CNFs may be deployed for disaggregation (also referred to as offloading). For example, to facilitate the deployment of disaggregated CNFs, the control components of a network function may be implemented in containers and scaled/managed (as needed) by a container management system. Additionally, or alternatively, the data-plane component may be off-loaded to networking hardware (e.g., a switching ASIC). One non-limiting example of a container management system may include Kubernetes (K8S). Other types of container management systems known and/or contemplated in the art may be utilized in different embodiments, and the example listed herein is not intended to be limiting. In some cases, disaggregated CNFs may facilitate in delivering high-throughput at the data-plane, which is useful for high-performance network functions (e.g., white-box switches using BROADCOM or INTEL TOFINO ASICs, to name two non-limiting examples, and capable of achieving multi-terabit per second traffic throughput while performing advanced packet processing actions).

Disaggregated CNFs with Programmable Network Hardware

In some examples, disaggregated CNFs with data-plane traffic offload may be combined with programmable data-plane pipelines, which allows instantiation of one or more network functions at the control plane layer. In some cases, the network functions are instantiated as containers or Kubernetes pods.

Additionally, or alternatively, disaggregated CNFs with programmable data-plane pipelines may also allow data-plane processing to be offloaded in a sequence (or combination of processing steps) to the programmable data-plane. In some aspects, the programmable data-plane allows the functional capabilities of the network system to be expanded/updated without having to replace the network hardware. Additionally, or alternatively, Cloud Native Control Plane (CNCP) may serve to simplify how highly available capabilities may be provisioned, for example, by eliminating the need to replicate and stitch independent configurations on individual boxes. In some cases, CNCP may treat the underlying networking hardware nodes as worker nodes, which may enable it to deploy network functions on available nodes. This facilitates in easing provisioning (i.e., since all configurations are in one place) and/or enhancing availability in case one or more worker nodes fail (e.g., by employing pod recovery mechanisms of Kubernetes), to name two non-limiting examples. In some examples, CNCP may be combined with programmable data planes. In such cases, a cloud native network function (CNF) implementation may be reduced to the implementation of the control plane only. That is, the CNF software code implemented in a container may or may not be used to process data packets.

FIG. 1 illustrates a conceptual view 100 showing a plurality of slice contexts 120 at a control plane 102, as well as the interaction between the control plane 102 and a hardware (HW) platform 104 for slice context communication, according to various aspects of the disclosure. In some examples, the HW platform 104 may also be referred to as network hardware 104, and the two terms may be used interchangeably throughout the disclosure.

Aspects of the disclosure are directed to providing (1) slicing at the physical networking infrastructure and/or (2) slice-specific data-pipelines. The use of slice-specific data-pipelines may serve to optimize resource isolation/partitioning in the network hardware 104, allow additional FPGA, CPU, etc., resources to be invoked, and/or allow added flexibility (e.g., with regards to enabling cloud networking features independently from slice to slice). As used herein, the terms "slicing", "network slicing", or "deep slicing" may be used interchangeably in the disclosure, and may refer to a combination of virtualization techniques, hardware (HW) resource management, and control plane mechanisms that enable tenant/customer isolation beyond the capabilities available in the prior art, for instance, the customer isolation capabilities supported in overlay networking (e.g., VLAN, VxLAN, VRF, Tunnels, etc.).

In some embodiments, a slice may be identified in one or more places/locations in the overall network architecture. As seen in FIG. 1, the control plane 102 comprises one or more slice contexts 120 (e.g., slice 1 context 120-a, slice 2 context 120-b, slice 3 context 120-c), where each of the one or more slice contexts 120 at the control plane 102 corresponds to a slice. In some cases, each slice context 120 comprises information pertaining to one or more of a topology map (or TopolMap), where the topology map defines the entities within the fabric topology that the corresponding slice is present on, and a port map that defines the switch ports that are included in the slices (across the topology map). Other types of information may be included in a slice context 120, and the examples listed herein are not intended to be limiting. Additionally, different slice contexts 120 may include different types of information, in some examples. In some instances, one or more of the slice contexts 120 may include a VLAN map or VxLAN map that defines what VLAN IDs or VxLAN network identifier (VNIs), or any other applicable L2/L3 parameters or their combinations are associated with the slice ports. In some implementations, the slice contexts 120 may also include a memory map that defines what memory units (e.g., memory capacity or relative address blocks for ternary content-addressable memory or TCAM, dynamic random-access memory or DRAM, and/or static random access memory or SRAM) are allocated to the corresponding slice; a CPU map (e.g., what and how many virtual CPUs are allocated for the slice); a FPGA map (what FPGA resources are allocated to a slice); slice identifier (or SLICE_ID); slice sub identifiers (e.g., if a slice is subdivided, a universal unique identifier or UUID may be provided for each sub-slice), slice type (e.g., an indication of the nature of a slice that can be used to apply specific data-plane processing), slice sub type (e.g., an indication of a nature of a sub-slice type that can be used to apply further data-plane processing at the sub-slice level), and/or slice topology (e.g., an indication of the scope of the slice, such as data center, metro, etc.), to name a few non-limiting examples. Some non-limiting examples of sub-slices include a 5G specific slice (e.g., a slice where 5G user plane processing is implemented), or a security specific sub-slice (e.g., a slice configured to process packets with a pre-defined cryptographic signature imbedded into the packets, where the cryptographic signature is pre-defined by the control plane). Other types of sub-slices are contemplated in different embodiments and the examples listed herein are not intended to be limiting.

Slice contexts 120 may also be implemented at the data plane, in some examples. Furthermore, slice identification may be applied hierarchically and directly in the network frame format at the inter-switch communications level, e.g., via tunneling. For example, the inter-switch fabric tunnel frame format may include one or more header(s) and field(s) for: a SLICE_ID, SLICE_SUB_ID, SLICE_TYPE, SLICE_SUB_TYPE, and SLICE_TOPOLOGY.

Slice identification at the data-plane layer facilitates in the management of traffic entering the physical fabric and directing it for processing according to the slice topology and type (e.g., "General slice", "Storage slice", "5G slice", "Secure slice", "Intra-DC slice", "Metro slice", etc.). For frames entering the network fabric from external devices, the initial mapping of the incoming frame to a slice can be performed based on the combination of the port identifier (PORT_ID), VLAN ID or VxLAN VNI, or any other applicable combination of L2/L3 identification fields. In some implementations, the slice is instantiated on the network switch hardware (e.g., shown as hardware platform 104 and programmable switching ASIC 106) by the control plane 102 at the time of provisioning. Furthermore, the slice context(s) 120 may be established and the corresponding ports (e.g., via PortMap information), VLANs and/or VxLANs (e.g., via VlanMap information) associated with the respective slice contexts 120. As seen, the plurality of slice contexts 120 identified on the control plane 102 have been instantiated on the programmable switching ASIC 106 of the hardware (HW) platform 104. In some examples, each of the one or more slice contexts 120 on the switching ASIC 106 is associated with a port group 108 (e.g., port group 108-a, 108-b, 108-c) and a TCAM space 110 (e.g., TCAM space 110-a, 100-b, 110-c). Additionally, a first slice context 120-a is associated with one or more CPU cores 112-a and a second slice context 120-b is associated with one or more FPGA cores 114-a of the HW platform 104. In some implementations, a slice context 120 may be associated with both CPU and FPGA cores. For example, FIG. 1 depicts a third slice context 120-c associated with both CPU cores 112-c and FPGA cores 114-c of the HW platform 104. It should be noted that, the slice contexts 120 described in relation to FIG. 1 are exemplary only, and not intended to be limiting. Furthermore, the number of slice contexts instantiated on the HW platform 104 is also exemplary. Specifically, more or less than three (3) slice contexts can be instantiated on a hardware platform, for instance, based on the hardware resources available, the number of tenants/customers sharing the hardware resources, the available bandwidth (or network traffic capacity) at the location hosting the HW platform, etc. While not necessary, in some examples, each of the one or more slice contexts 120 in FIG. 1 may be associated with a different tenant/customer. By instantiating a different slice context 120 for each tenant, where each slice context 120 includes dedicated or allocated resources (e.g., ports, overlay network constructs, such as VLAN, VxLAN, VRFs, TCAM, FPGA, and/or CPU cores), while at the same time reusing certain network resources (e.g., L2/L3 address spaces), aspects of the present disclosure facilitate in representing slices as collections of virtualized network elements, further described below in relation to FIG. 3.

Figure 3:
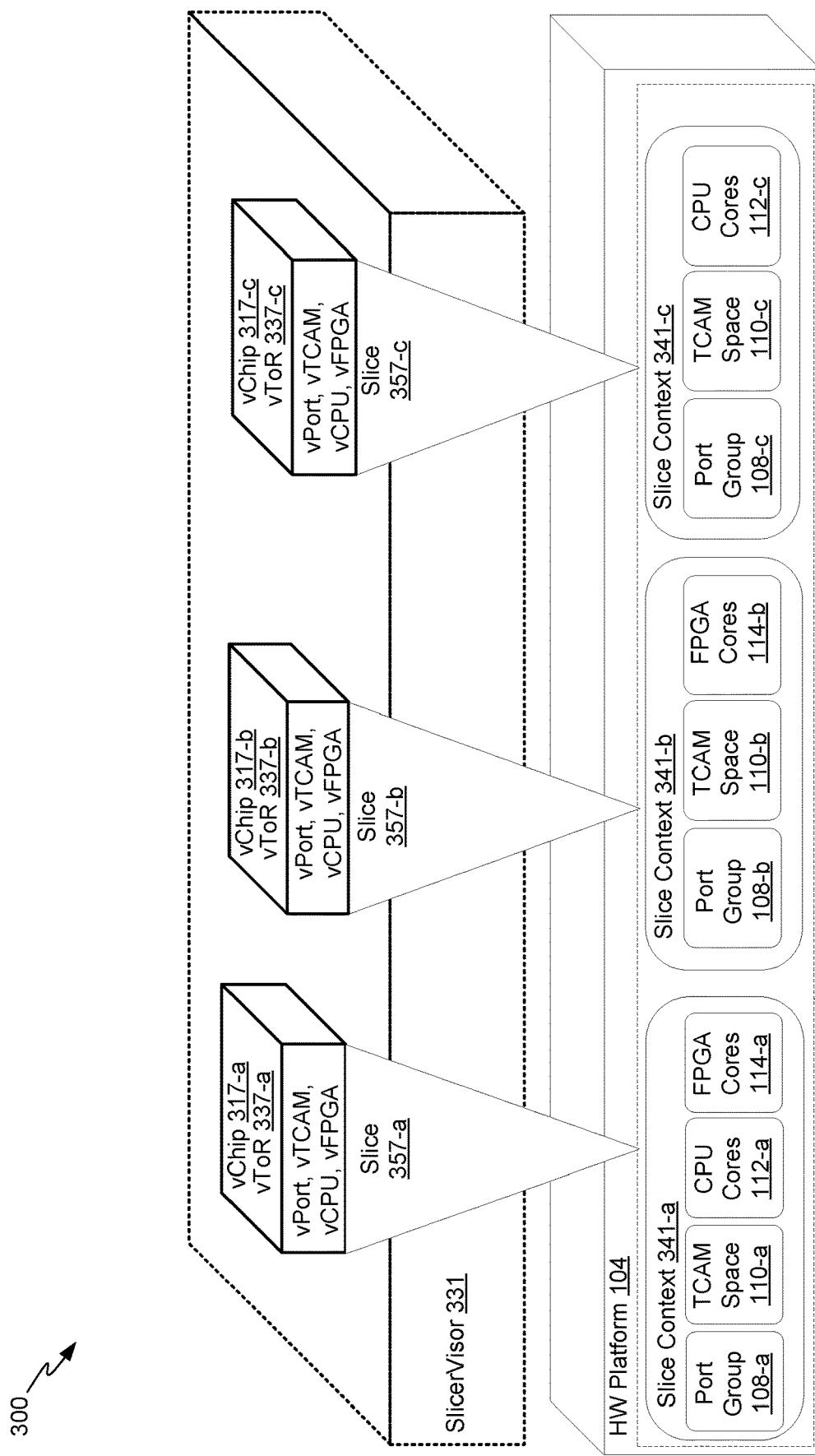
FIG. 3 illustrates an example conceptual view of a slicer visor and one or more virtual chips (vChips), in accordance with various aspects of the present disclosure.

In some cases, a hypervisor (also known as a VM monitor or VMM) may be configured to create and run VMs. The hypervisor may allow a host computer to support multiple guest VMs by virtually sharing its resources (e.g., memory, processing). As used herein, the term slicer visor (or "SlicerVisor") may refer to a hypervisor layer running on physical switches/fabric. The slicer visor layer may serve as an abstraction layer and may be used to map/allocate resources of the network switch hardware (e.g., ASIC 106) to the slice contexts to create a resource mapping for the slice contexts. In other cases, the mapping of resources of the network switch hardware comprises allocating resources utilizing direct partitioning of the network switch hardware. In either case, the mapping of resources comprises tailoring the mapping to specific network switch hardware based upon specified requirements (e.g., from the tenant/customer). Turning now to FIG. 3, which depicts a conceptual view 300 of a slicer visor abstraction layer 331 (or simply slicer visor 331) running on a hardware platform 104, according to various aspects of the disclosure. In some examples, the HW platform 104 may be similar or substantially similar to the HW platform described in relation to FIG. 1. As seen, the HW platform 104 further comprises a programmable switching ASIC 306, where the programmable switching ASIC 306 implements one or more aspects of the programmable switching ASIC 106 in FIG. 1. In some cases, the control plane 102 is configured to communicate with the slicer visor 331 layer to execute one or more of the methods/functions described herein, including at least the method described in relation to FIG. 10.

In some embodiments, the slicer visor 331 may be used to represent partitions of physical networking platform resources, such as, but not limited to, TCAM spaces 110, CPU cores 112, FPGA cores 114, and/or processing pipelines, as virtual resources. For example, the slicer visor 331 may be configured to construct a plurality of virtual chips 317 (shown as vChips 317-*a*, 317-*b*, 317-*c*), where each vChip 317 exposes one or more of a virtual port (vPort), a virtual TCAM (vTCAM), a virtual CPU (vCPU), and/or a virtual FPGA (vFPGA). In some examples, one or more of the vChips 317 may also expose corresponding data-plane pipelines. In some embodiments, the virtual chips 317 may be used to run network software (e.g., containerized implementations of virtual top of rack or vTOR switches, virtual routers, and/or virtual user plane functions), which enables instantiation and management of slices 357 (e.g., slices 357-*a*, 357-*b*, 357-*c*), e.g., in a manner similar to Virtual Machines or VMs. In some aspects, the slices 357 represent collections of virtualized network elements.

In some implementations, network slicing comprises transforming a network into a set of logical networks on top of a shared infrastructure. Each logical network may be designed to serve a defined business purpose and comprises the required network resources, configured and connected end-to-end. In some cases, a network slice (e.g., slice 357) comprises a logically separated, self-contained, independent, and optionally secured part of the network. Each slice 357 may be configured to target different services with different speed, latency, and/or reliability requirements. Some non-limiting examples of slice 357 characteristics include low latency, high bandwidth, and high-reliability (e.g., for a critical internet of things or IoT use case); and higher latency and lower bandwidth (e.g., for a massive IoT use case). In some instances, a slice 357 may be dedicated to one enterprise customer, or alternatively, shared by multiple tenants. In some embodiments, a slice may be associated with dedicated radio, transport, and/or core resources, including a dedicated user plane function (UPF) at the edge. Further, another slice 357 may share radio and/or transport resources with one or more other tenants, while providing dedicated core network functions for each of the one or more tenants, as an example.

Thus, aspects of the present disclosure serve to enhance control plane capabilities by supporting (1) instantiation and management of slices within a physical fabric, (2) management of resource allocation for slices (e.g., coordinating TCAM, FPGA, and/or CPU resources) on one or more physical switches supporting a slice, (3) identification of optimal slice placements in the physical infrastructure based at least in part on the specified requirements (e.g., security, 5G capabilities/proximity to access networks, to name two non-limiting examples), and/or (4) coordination between slice identification at the control and data plane layers. In some examples, the slicer visor abstraction layer 331, or alternatively, the direct partitioning of the network switch hardware/ASIC 306, may be employed for management of resource allocation for slices 357 supported on the ASIC 306. As seen in FIG. 3, the programmable switching ASIC 306 comprises three partitions, one for each slice 357 (or slice context 341). Further, the partitions of the one or more physical networking platform resources, such as, TCAM spaces 110, CPU cores 112, and/or FPGA cores 114 are represented as virtual resources. In other words, each slice context 341 on the ASIC 306 corresponds to a set of virtual resources. In some instances, the present disclosure may enable coordination between slice identification at the control and data plane layers (shown as control plane 102 and control-data plane protocol 113 in FIG. 1) with externally facing protocols/capabilities, such as segment routing, SRv6, etc., which facilitates integration with regional/global interconnection fabrics.

Figure 4:
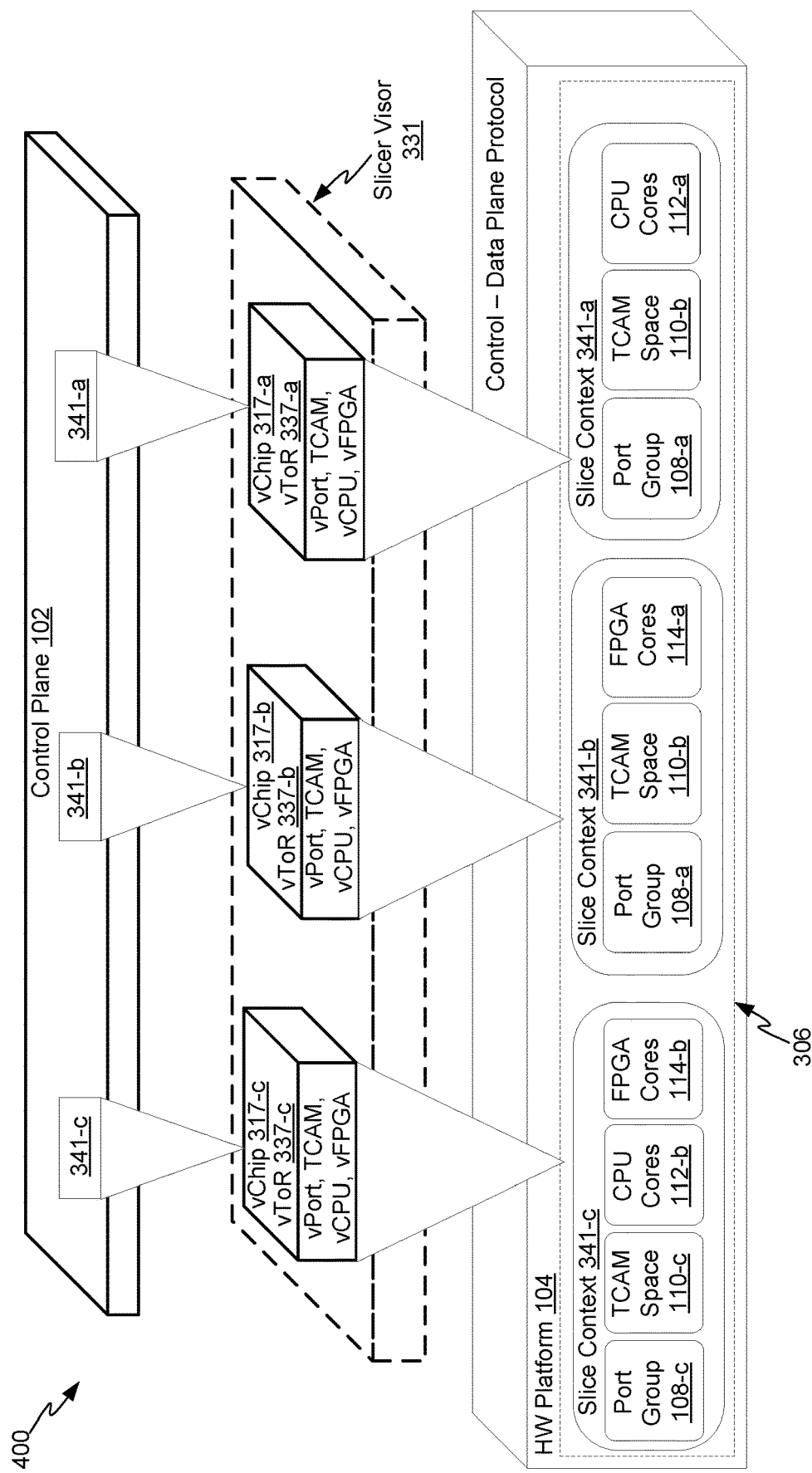
FIG. 4 illustrates an example showing the interaction between a control plane and a slicer visor, according to various aspects of the disclosure.

FIG. 4 depicts a conceptual view 400 showing the interaction between the control plane 102 and the slicer visor 331, according to various aspects of the disclosure. In some cases, FIG. 4 implements one or more aspects of the figures described herein, including at least FIGS. 1 and/or 3. As seen, the control plane 102 comprises a plurality of slice contexts 341 (e.g., slice context 341-*a*, 341-*b*, 341-*c*), which may be similar or substantially similar to the slice context(s) 120 and/or the slice context(s) 341 described in relation to FIGS. 1 and/or 3, respectively. For the sake of brevity, the slice contexts 341 have been shown as a single block. However, it should be appreciated that, each of the one or more slice contexts 341 may include one or more of a SLICE_ID, SLICE_SUB_ID, SLICE_TYPE, SLICE_SUB_TYPE, SLICE_TOPOLOGY, topology map, port map, VLAN map, memory map, CPU map, and/or FPGA map, to name a few non-limiting examples. Furthermore, the type of information included or associated with each slice context 341 may be the same or different. As an example, a first slice context 341-*a* may include a CPU map, a second slice context 341-*b* may include a FPGA map, and a third slice context 341-*c* may include both a CPU and a FPGA map.

As noted above, slices may be identified in multiple places in the overall network architecture. In some examples, one or more slices may be identified or defined at the control plane 102 using one or more slice contexts 341, where each slice context corresponds to one slice. The control plane 102 may be configured to communicate with the slicer visor 331 layer for instantiation and management of slices within the physical fabric, management of resource allocation (e.g., TCAM 110, FPGA 114, CPU 112 resources) for slices, identification of optimal slice placements in the physical infrastructure based on the customer specified requirements, and/or for coordinating slice identification at the control and data plane layers with externally facing protocols/capabilities, such as segment routing or SRv6. While not necessary, in some embodiments, the control plane 102 may communicate with the slicer visor abstraction layer 331 for management of resource allocation for slices on at least a portion (or all) of the physical switches (e.g., ASIC 306) supporting a slice. As seen in FIG. 4, a plurality of virtual chips 317 are constructed at the slicer visor 331 layer based on the communication between the control plane 102 and the slicer visor 331 layer. For example, a virtual chip 317 is constructed for each slice context 341 in the control plane 102. The vChips 317 may be configured to run network software, such as, but not limited to, containerized implementations of vTORs 337, virtual routers (not shown), or virtual user plane functions (not shown).

In the example shown, the slicer visor abstraction layer 331 is used to instantiate the one or more slice contexts 341 (e.g., slice context 341-*a*, 341-*b*, 341-*c*) on the programmable switching ASIC 306 of the HW platform 104, based upon the communication with the control plane 102. The control plane 102 may indicate how the TCAM space(s) 110, FPGA core(s) 114, and/or CPU core(s) 112 should be allocated for the slice contexts 120, what port group(s) 108 should be used/included in the slices, etc. In some cases, the port group 108 (also referred to as switch port 108) allocated to a slice context 341 in the ASIC 306 is based on one or more of the topology map and/or port map information for the corresponding slice context 341 in the control plane 102.

In other cases, the control plane 102 is configured to directly create partitions for each slice context 341 on the programmable switching ASIC 306 for management of resource allocation for the slices. In this way, aspects of the present disclosure enable slices/slice contexts to be created or instantiated at both the control plane layer 102 and the HW platform 104.

Figure 2:
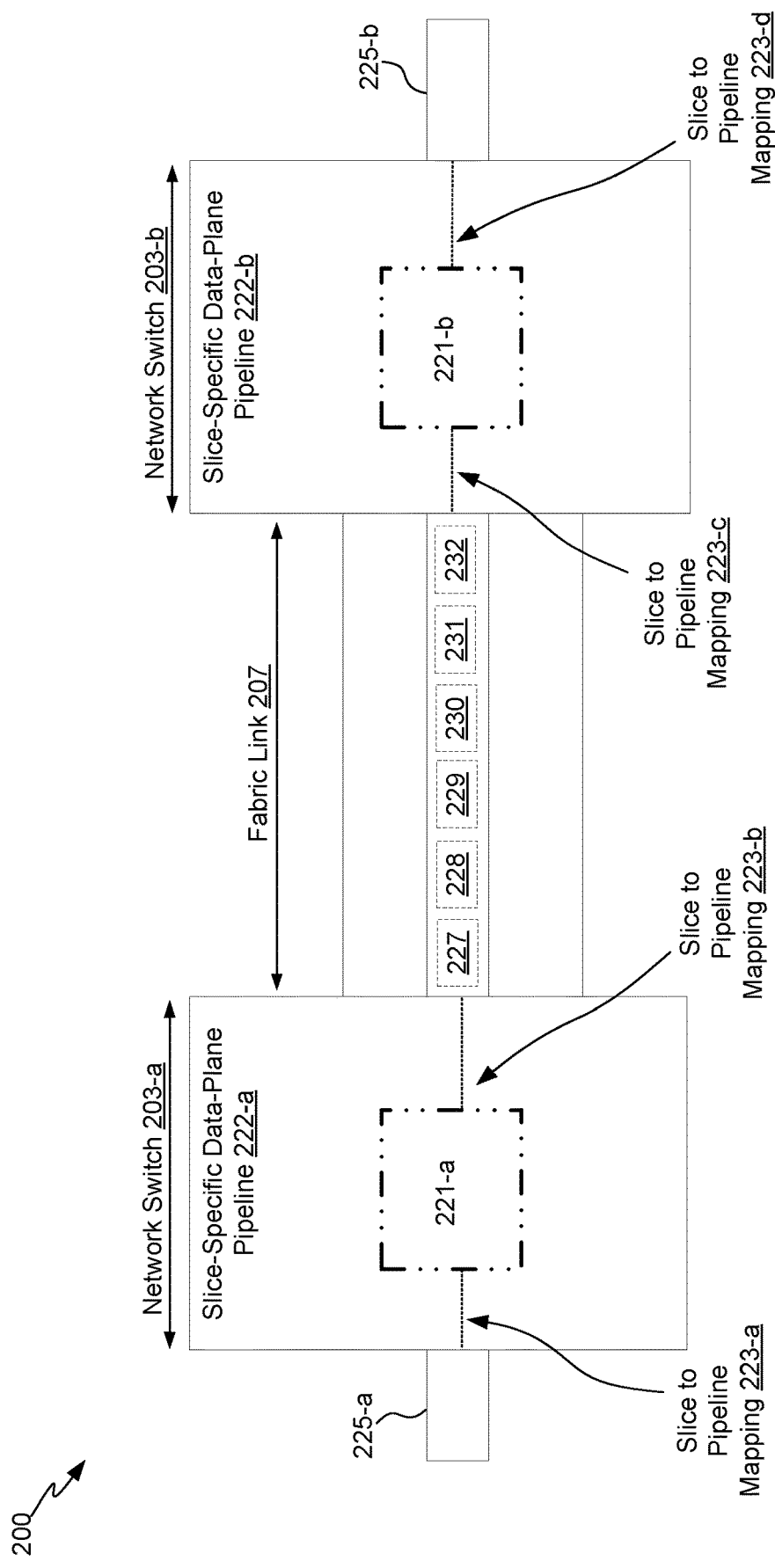
FIG. 2 illustrates an example showing slice to data-plane mapping at one or network switches, in accordance with various aspects of the present disclosure.

Turning now to FIG. 2, which illustrates an example of slice to data-plane mapping implemented in a network fabric 200, in accordance with various aspects of the present disclosure. As seen, FIG. 2 shows a plurality of network switches 203-*a*, 203-*b* and a fabric link 207, where the fabric link 207 is used to connect the two network switches 203. In some examples, the fabric link 207 is a switch-to-switch link internal to the network fabric 200 (i.e., as opposed to the access link between a connecting device and a network switch 203). The network switches 203 may be embodied in hardware, software, or a combination thereof. Each network switch 203 further comprises an external port 225, for example, for communication with regional/global interconnection fabrics, other components or elements of the network architecture (e.g., software-defined network or SDN controller, to name one non-limiting example), another fabric link, or another network switch, to name a few non-limiting examples. As seen, each of the network switches 203 comprises a slice-specific data-plane pipeline 222. As noted above, when data frames (or simply, frames) enter the network fabric 200 from one or more external devices, they are initially mapped to network slice(s). The initial mapping of an incoming frame to a corresponding network slice may be based on one or more of the port identifier (PORT_ID) and the VLAN identifier (or alternatively, the VxLAN VNI). For example, when a data frame enters the external port 225-*a* of network switch 203-*a*, a slice to pipeline mapping 223-*a* is performed at the input of block 221-*a* in the network switch 203-*a*, based upon the port map and/or VLAN map information. In some cases, the port map and/or VLAN map information may be examples of control-plane data that are created for each of a plurality of network slices. Other examples of control-plane data include memory map information, CPU map information, FPGA map information, SLICE_ID, SLICE_SUB_ID, SLICE_TYPE, SLICE_SUB_TYPE, and SLICE_TOPOLOGY, as described above in relation to FIG. 1. In some examples, data-plane data may also be created for each of the plurality of network slices. The control plane layer 102 is configured to store the control-plane data and the data-plane data for each of the plurality of network slices to produce slice contexts 120. In this example, a second slice to pipeline mapping 223-*b* is performed at the output of block 221-*a*, where the second slice to pipeline mapping 223-*b* is based at least in part on the slice header 230 corresponding to the slice (or data frame). The fabric link 207 comprises one or more of a fabric L2 header (227), a fabric L3 header (228), a slice header (229), a user L2 header (230), a user L3 header (231), and a user payload (232). In some cases, the fabric L2 header (227) comprises the L2 header of a frame sent on a fabric switch-to-switch link. Similarly, the fabric L3 header (228) comprises the L3 header of a frame sent on a fabric switch-to-switch link. While not necessary, in some cases, the user headers (e.g., user L2 header (230), user L3 header (231)) may be located deeper (e.g., as compared to the fabric L2/L3 headers) in the frame and after the fabric headers. One or more elements (i.e., 227, 228, 229, 230, 231, and 232) of the fabric link 207 may be optional (shown by the dashed lines). In some examples, the slice header 230 includes information pertaining to one or more of the slice identifier, slice sub identifier, slice type, slice sub type, and/or slice topology for a corresponding slice.

Similar to network switch 203-*a*, the network switch 203-*b* also includes an external port (225-*b*) and a slice-specific data-plane pipeline 222-*b*. In some cases, the network switch 203-*b* (or alternatively, block 221-*b* in the network switch 203-*b*) is configured to perform a slice to pipeline mapping 223-*d* at the input of block 221-*b*, based on the port map and/or VLAN map information, and another slice to pipeline mapping 223-*c* at the output of block 221-*b*, based on the slice header 230.

As used herein, the term "slice-specific data-plane pipelines" refers to the application of different data packet processing pipelines for different network slices, e.g., based on the purpose (e.g., customer/tenant requirements) of a specific network slice. In some examples, a slice-specific data-plane pipeline 222 may be implemented by making a programmable data-plane pipeline aware of a slice. In this way, independent data processing pipelines may be deployed on a per slice basis, which serves to optimize resource usage (e.g., hardware resources, network resources, computational processing power, etc.). In one non-limiting example, slice-specific data-plane pipelines 222 may be implemented via the data-plane pipeline programming language, which enables the program to use the slice identification (slice ID) information for purposes of data-plane virtualization and/or triggering intended packet processing actions based on slice types. As an example, only specific data plane actions may be allowed for a given network slice. Said another way, aspects of the present disclosure enable slice-specific data plane actions (i.e., as opposed to enabling a full data pipeline feature set across all slices) based on the purpose of the slice. For instance, the type of data plane actions enabled/disabled and/or the packet processing pipeline applied may be based on the slice type (e.g., 5G slice type, storage slice type, or virtual private cloud or VPC slice type, to name a few non-limiting examples). In some cases, the programmable data pipeline (e.g., QoS, L2/L3, VLAN/VxLAN, Firewall, Load Balancer, Telemetry, etc.) may be different for different slice contexts (or slices) and may be based on the slice type and/or the slice topology (e.g., Metro Slice, DC). It is contemplated that such a design may help reduce the overhead, as compared to the prior art, due to the potential reduction in the number of data plane actions that need to be configured for a network slice. In some examples, the slice identification (or slice ID) information described herein may be included in the data frame (e.g., fabric frame). Further, the program (e.g., a data-plane program) may be configured to read the slice ID information in the frame and invoke specific data plane processing programming for that data frame, for example, based on the control plane data for the corresponding slice context.

Figure 5:
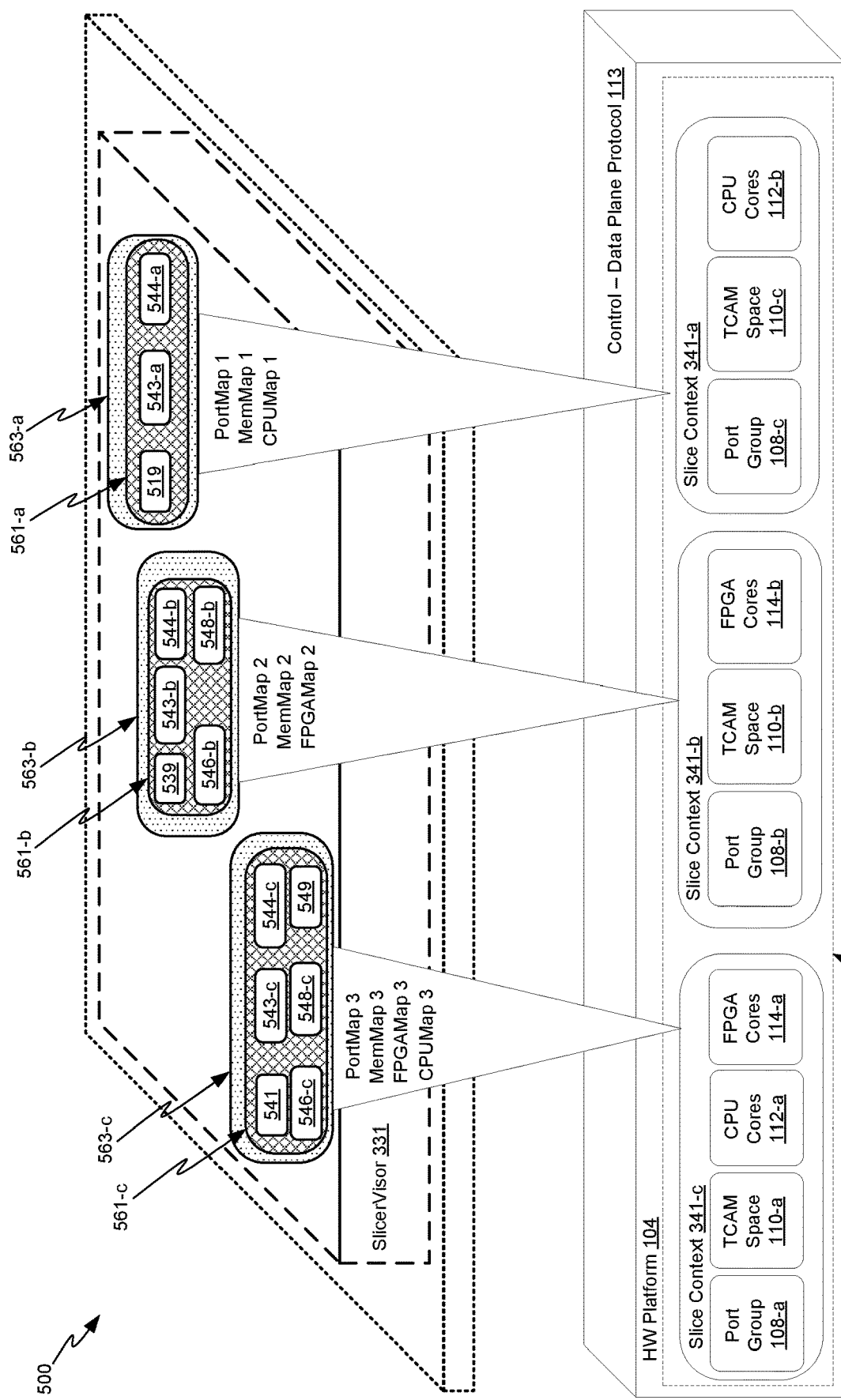
FIG. 5 illustrates a conceptual view of a slicer visor and multiple slice-specific data-plane pipelines, according to various aspects of the disclosure.

FIG. 5 illustrates a conceptual view of a network fabric 500 having a slicer visor 331, according to various aspects of the disclosure. The slicer visor 331 comprises a plurality of slices 563, where each slice 563 includes a slice-specific data-plane pipeline 561. The slice-specific data-plane pipelines 561 may implement one or more aspects of the data-plane pipelines 222 described above in relation to FIG. 2. Further, the slicer visor 331 may be similar or substantially similar to the slicer visor 331 described in relation to FIGS. 3 and/or 4.

In some cases, data processing pipelines may be deployed on a per slice basis, herein referred to as a slice-specific data-plane pipeline. In some cases, the slice-specific data-plane pipelines 561 may be implemented by using the slice identification (or SLICE_ID) as the data-plane virtualization mechanism and using the information related to the slice type for triggering packet processing actions. In one non-limiting example, the type of data plane actions supported for a given slice may be restricted/limited based on the slice type. In other words, the data pipeline features enabled for different slices may be different and not all data pipeline feature sets may need to be enabled for all slices, which may serve to reduce overhead.

In some examples, different packet processing pipelines may be applied to different slices 563, for example, based on the purpose of the slice. For example, the system (e.g., system 600 in FIG. 6) may receive network slice requirements from a control plane 102 (e.g., a 5G control plane) and create control-plane data and data-plane data based on the network slice requirements. The system may be configured to create control and data-plane data for each of the plurality of network slices 563 and store said data for the network slices 563 to produce the slice contexts 341. The system may also instantiate the plurality of network slices 563 on the ASIC 306 (i.e., network switch hardware), where the instantiation comprises programming the network switch hardware based on the type of slice defined by the data-plane data.

As seen, FIG. 5 depicts three slices 563, where each slice 563 comprises a slice ID, a slice type, and a slice topology. As an example, the first slice 563-*a* comprises a slice ID=1, Slice Type=5G, and Slice Topology=DC. Further, the second slice 563-*b* comprises a slice ID=2, Slice Type=VPC, and Slice Topology=Metro Slice, and the third slice 563-*c* comprises a slice ID=3, Slice Type=Storage, and Slice Topology=Metro Slice. Each slice 563 further comprises a programmable data pipeline 561. In this example, the programmable data pipeline 561-*a* for the first slice 563-*a* includes a 5G user plane function (UPF) 519, a L2/L3 address space 543-*a*, and a VLAN/VxLAN 544-*a*. Similarly, the programmable data pipeline 561-*b* for the second slice 563-*b* includes a network address translation (NAT) 539, a L2/L3 address space 543-*b*, a VLAN/VxLAN 544-*b*, a firewall 546-*b*, and a load balancer 548-*b*. The programmable data pipeline 561-*c* comprises a QoS 541, a L2/L3 address space 543-*c*, a VLAN/VxLAN 544-*c*, a firewall 546-*c*, a load balancer 548-*c*, and telemetry 549. In some cases, the programmable data pipelines 561 may be referred to as slice-specific data-plane pipelines 561 (or simply slice-specific pipelines 561).

As seen, the slices 563 at the slicer visor abstraction layer 331 are mapped to corresponding slice contexts 341 at the network switch hardware, where the network switch hardware includes the HW platform 104 and the programmable switching ASIC 306. In this example, port map 1, memory map 1, and CPU map 1 are used to map the slice 563-*a* to the slice context 341-*a*. Further, slice 563-*b* is mapped to the slice context 341-*b* using port map 2, memory map 2, and FPGA map 2. Lastly, slice 563-*c* is mapped to the slice context 341-*c* using the port map 3, memory map 3, FPGA map 3, and CPU map 3. These mappings allow the creation of a resource mapping for mapping the resources of the ASIC 306 to the different slices/slice contexts. The system then instantiates the plurality of network slices 563 on the ASIC 306 using the resource mapping, further described below.

As seen, each slice 563 (or slice context 341) is mapped to a respective port group 108, TCAM space 110, and one or more of CPU cores 112 and FPGA cores 114 of the ASIC 306. As noted above, the port maps (e.g., port map 1, port map 2, etc.) are used to define what switch ports/port group 108 are utilized for each slice 563. Further, the memory maps (e.g., memory map 1) define the TCAM space 110 (or alternatively, the DRAM/SRAM memory capacity or relative address blocks) allocated to each slice 563. Lastly, the CPU and FPGA maps define the virtual CPUs and FPGA resources, respectively, allocated to the different slices 563. For example, the FPGA map 3 and CPU map 3 are used to define the FPGA cores 114-*c* and CPU cores 112-*c*, respectively, allocated to the slice 563-*c*.

Figure 6:
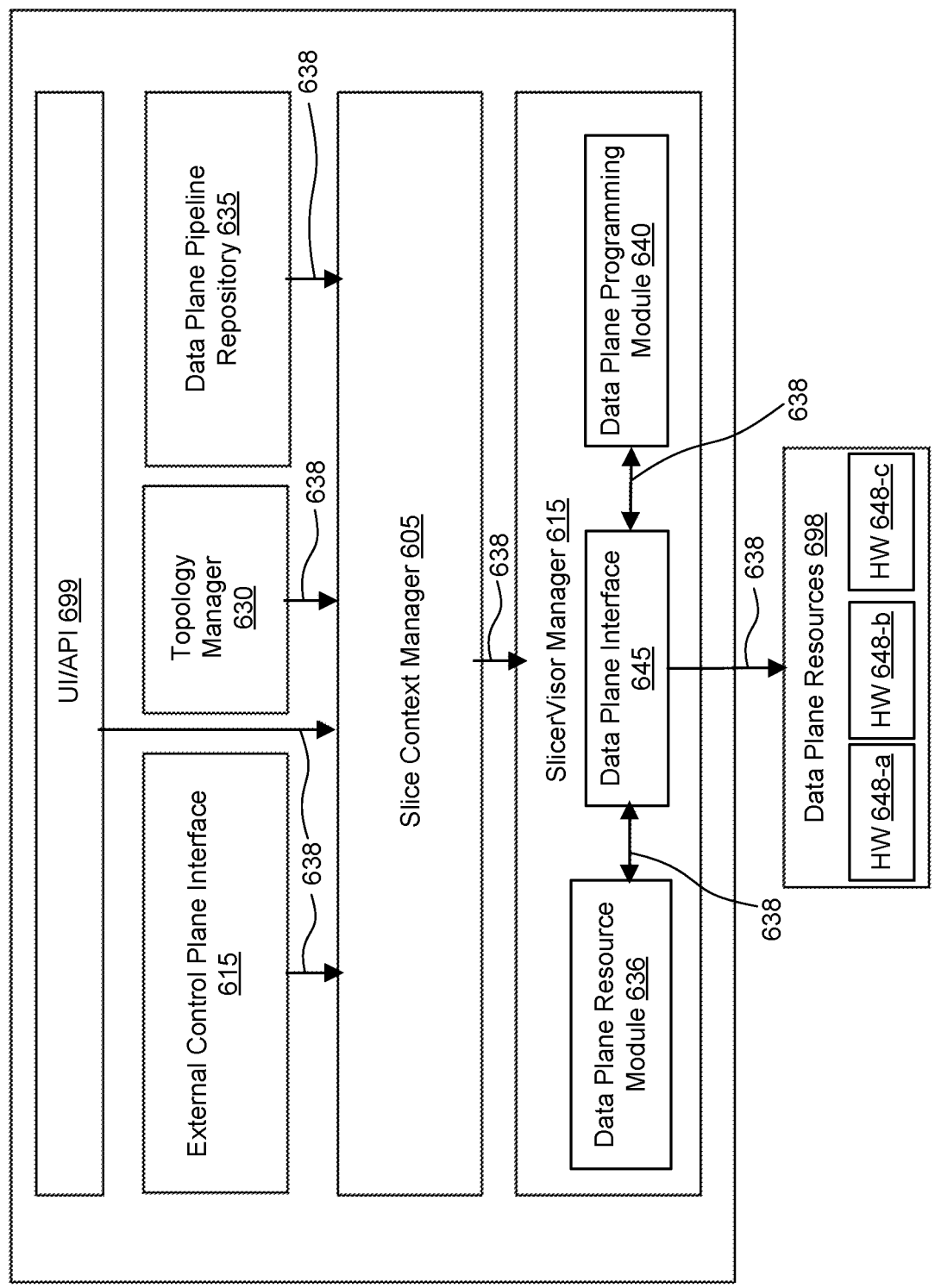
FIG. 6 illustrates a block diagram of a computing system configured for network slicing with virtualized programmable data-plane pipelines, according to various aspects of the disclosure.

FIG. 6 illustrates a block diagram of a computing system 600 configured for network slicing with virtualized programmable data-plane pipelines, according to various aspects of the disclosure.

As seen, the computing system 600 comprises an interface 699, where the interface 699 may be an example of a user interface (UI) or an application programming interface (API). The computing system 600 further includes an external control plane interface 615, a topology manager 630, and a data plane pipeline repository 635. In some embodiments, the computing system 600 also includes a slice context manager 605 and a slicer visor manager 615, where the slicer visor manager 615 comprises a data plane resource module 636, a data plane interface 645, and a data plane programming module 640. In some cases, the computing system also includes data plane resources 698, where the data plane resources 698 includes one or more hardware resources (e.g., shown as HW 648-*a*, HW 648-*b*, HW 648-*c*). Some non-limiting examples of hardware resources include a central processing unit (CPU), DRAM/SRAM, and/or FPGA. Other types of hardware resources known and contemplated in the art may be utilized in different embodiments. In some examples, the various entities of the system 600 may be in communication using one or more buses 638.

In some embodiments, the system 600 is configured to receive one or more frames from one or more external sources (not shown), where the frames may be received at the UI/API 699. In some cases, each of the one or more frames (e.g., data frames) may be associated with a network slice, which may be similar or substantially similar to the network slices 563 described in relation to FIG. 5. As noted above, slice identification at the data-plane layer may allow management of traffic entering the physical network fabric and directing it for processing based on the slice topology and/or slice type (e.g., general slice, storage slice, 5G slice, secure slice, intra-DC slice, metro slice, etc.). In some examples, when a frame enters the physical network fabric from an external source/device, the slice context manager 605 is configured to perform an initial frame-to-slice mapping. This initial frame-to-slice mapping is based on one or more of the port ID, VLAN ID or VxLAN VNI, or any other combination of applicable L2/L3 identification fields. In some examples, one or more slice contexts (e.g., shown as slice contexts 341 in FIGS. 3 and/or 5) may be established at the data plane resources 698. For example, a slice context may be established at each HW 648 of the data plane resources 698. Furthermore, one or more ports, VLANs, and/or VxLANs at the HW 648 may be linked to each of the one or more slice contexts. In some examples, the slice contexts may be created based on creating control-plane data, creating data-plane data, and storing the control/data-plane data for each of a plurality of network slices. In some cases, the creation of the control-plane and data-plane data is further based upon the network slice requirements received from a control plane, such as a 5G control plane. This allows for the creation of a slice context defined by the control plane.

In some cases, the slice context manager 605 may be configured to communicate with one or more of the external control plane interface 615, topology manager 630, data plane pipeline repository 635, and/or UI/API 699 using buses 638. The slice context manager 605 may receive slice topology specific information (e.g., indication of the scope of a slice, such as data center, metro, etc.) from the topology manager 630. Further, the slice context manager 605 may be configured to receive data-plane data for each of the plurality of network slices from the data plane pipeline repository 635. In some examples, the data plane pipeline repository 635 may be configured to create data-plane data for each of the plurality of network slices. In some cases, the external control plane interface 615 (or another element of the system 600) may be configured to create control-plane data for each of the plurality of network slices. The slice context manager 605 may create the one or more slice contexts based at least in part on the control-plane data and data-plane data for each of the plurality of network slices. In some cases, the slice context manager 605 may store the control-plane data and the data-plane data for each of the plurality of network slices to produce stored slice contexts.

The slice context manager 605 may provide information pertaining to the stored slice contexts to the slicer visor manager 615. The slicer visor manager 615 is configured to manage the slicer visor abstraction layer (e.g., shown as slicer visor 331 in FIGS. 3-5), for example, for management of resource allocation for the one or more slices. As noted above, slices may be instantiated on the network switch hardware (e.g., HW 648) based on data received from the control plane. Further, the slicer visor manager 615 may help in instantiation and management of the network slices. In some aspects, the disclosed network slices represent collections of virtualized network elements. Some non-limiting examples of virtualized network elements include virtual switches for connecting networking components together, bridges for connecting a VM to the LAN used by a host computer, a host-only adapter or virtual ethernet adapter for communicating between a host computer and the VM(s) on that host computer, a NAT device for connecting VMs to an external network, and/or dynamic host configuration protocol (DHCP) servers, to name a few non-limiting examples.

In some examples, the slicer visor manager 615 comprises a data plane resource module 636, a data plane interface 645, and a data plane programming module 640. In some instances, the data plane resource module 636 determines what network switch hardware resources (e.g., FPGA resources, CPU resources, etc.) are allocated to a slice. Additionally, or alternatively, the data plane resource module 636 also determines the TCAM and/or DRAM/SRAM memory capacity, memory blocks, address blocks, etc., allocated to a network slice. In some cases, this information is used to create "memory enclaves" for slice isolation. In some examples, the data plane resource module 636 passes this data-plane specific resource information to the data plane interface 645 via a bus 638.

The data plane programming module 640 uses the slice identification information (e.g., received from the slice context manager 605) for (1) configuring the data-plane virtualization mechanism, and (2) triggering intended packet processing actions based on slice types, to name two non-limiting examples. In some cases, the data plane programming module 640 (or another module of the system 600) facilitates in creating the slice-specific data-plane pipelines 561 based on the slice ID, slice type, slice topology. Depending on the slice type and/or slice topology, the data plane programming module 640 determines what data plane actions should be supported/allowed for a given slice. In addition to the above, the data plane programming module 640 may also be configured to program the network switch hardware based upon a type of slice (e.g., 5G slice, storage slice) defined by the data-plane data.

In some embodiments, the data plane programming module 640 provides information pertaining to the slice-specific data-plane pipelines (e.g., programmable data pipelines 561 in FIG. 5) to the data plane interface 645 via a bus 638. Further, the data plane interface 645 instantiates the various slices/vTORs on the network switch hardware. In some cases, the instantiation is based on the resource mapping and comprises programming the network switch hardware. In some instances, the data plane interface 645 (or the data plane programming module 640) directly program the HW 648. Alternatively, the data plane interface 645 relays resource allocation information to the data plane resources 698 for each of the one or more network slices/vTORs. In such cases, the data plane interface 645 and the data plane resources 698 are used to coordinate allocation of TCAM, FPGA, CPU resources, etc., to each network slice. In this example, each of HW 648-*a*, 648-*b*, and 648-*c* may be associated with a different slice/slice context/vTOR. Further, HWs 648 may comprise one or more of a port group (e.g., port group 108 in FIG. 1), TCAM space (e.g., TCAM space 110), CPU cores (shown as CPU cores 112 in FIG. 1), and FPGA cores (e.g., FPGA cores 114 in FIG. 1). In some cases, the topology map, port map, VLAN or VxLAN map, memory map, CPU map, and/or FPGA map information for the slices/slice contexts are also utilized for instantiation of the network slices on the HW 648.

Once the network slices are instantiated, the system 600 is configured to direct frames from one or more external sources to a slice-specific data-plane pipelines. For example, after receiving frames from one or more external sources, the system 600 identifies a network slice corresponding to each frame. Then, the system is configured to enrich a header of each of the frames based upon the identification of the network slice for each frame to direct each frame to a data-plane pipeline.

In some aspects, the use of slice-specific data-plane pipelines allows function-specific vTORs to be deployed in a network. In some cases, aspects of the present disclosure facilitate instantiation of different types of vTORs (also referred to as function-specific vTORs), where each vTOR is designed to support specific requirements, such as 5G traffic processing, storage, and/or security, including at the metro level, to name a few non-limiting examples. In some cases, the types of tasks (e.g., 5G traffic processing) supported by a vTOR may be linked to the data pipeline processing capabilities of said vTOR. As an example, the network slice 563-*a* and programmable data pipeline 561-*a* in FIG. 5 may be associated with a 5G vTOR, the slice 563-*b* and programmable data pipeline 561-*b* with a secure vTOR, and the slice 563-*c* and programmable data pipeline 561-*c* with a storage vTOR.

It should be noted that, each slice/slice context/vTOR described herein may be linked to a different tenant or customer. Accordingly, each of the HW resources 648 may also be assigned to a single tenant and isolated from the other HW resources. Aspects of the present disclosure also facilitate in creation of vTORs in bare metal deployments owned/operated by customers. In some cases, each vTOR may be a slice of the physical network fabric and may implement one or more aspects of a bare metal ToR. Further, the vTOR/slice may comprise a vTOR-specific data-plane pipeline, which may be similar or substantially similar to the programmable data pipelines described above in relation to FIG. 5. In this way, a common physical data center fabric may be deployed for multiple cloud customers (e.g., bare metal cloud customers) and vTORs may be activated/deactivated as customers spin them up and down with metal deployments. As such, each vTOR may be configured with capabilities that are specifically tailored to the customer/tenant and based upon customer specified requirements. In other words, the present disclosure enables customer-specific capabilities in each vTOR independently from other customers.

In some embodiments, the system 600 implements one or more cloud networking features and/or enables additional data plane capabilities by using programmable platforms added to the network fabric and/or in the metal ToR/DC fabric capacity. In some embodiments, aspects of the present disclosure may be implemented in a "brownfield deployment" with existing network platforms. In one non-limiting example of a brownfield deployment, programmable switches may be added to existing networks to implement one or more of the functionalities described in this disclosure. In the field of information technology/networking, a brownfield deployment refers to the installation and configuration of new hardware and/or software that is configured to coexist with legacy (i.e., currently used) IT/networking systems. Some non-limiting examples of the additional features and/or data plane capabilities supported by the system of the present disclosure include (1) L2 switching, (3) L3 vRouter with IGP, BGP, MPLS, routing policies, multiple sub-nets and VRFs within a vRouter, (4) IPv4 and IPv6 address overlap across independent vToR's L3 vRouters, (5) Intra-Metro distributed vTOR, (6) Inter-Metro distributed vTOR, (7) Integrated Data Center Interconnect Services, (8) Load Balancing (fabric/ToR based), (9) High Performance FW, (10) Enhanced telemetry and observability, (11) High performance 5G UPF, (12) Network Slicing, and/or (13) NAT/NAPT. It should be noted that, one or more of the additional features and/or data plane capabilities discussed above may be optional. In other cases, different vTORs support different ones of the features and data plane capabilities (i.e., (1)-(12). In yet other cases, the vTORs within a first data center may support a first set of the features/data plane capabilities (e.g., features (1)-(4) and (10)-(12)), and the vTORs within a second data center may support a second set of the features (e.g., features (1)-(3) and (5)-(8), and (11)-(12)).

Figure 7A:
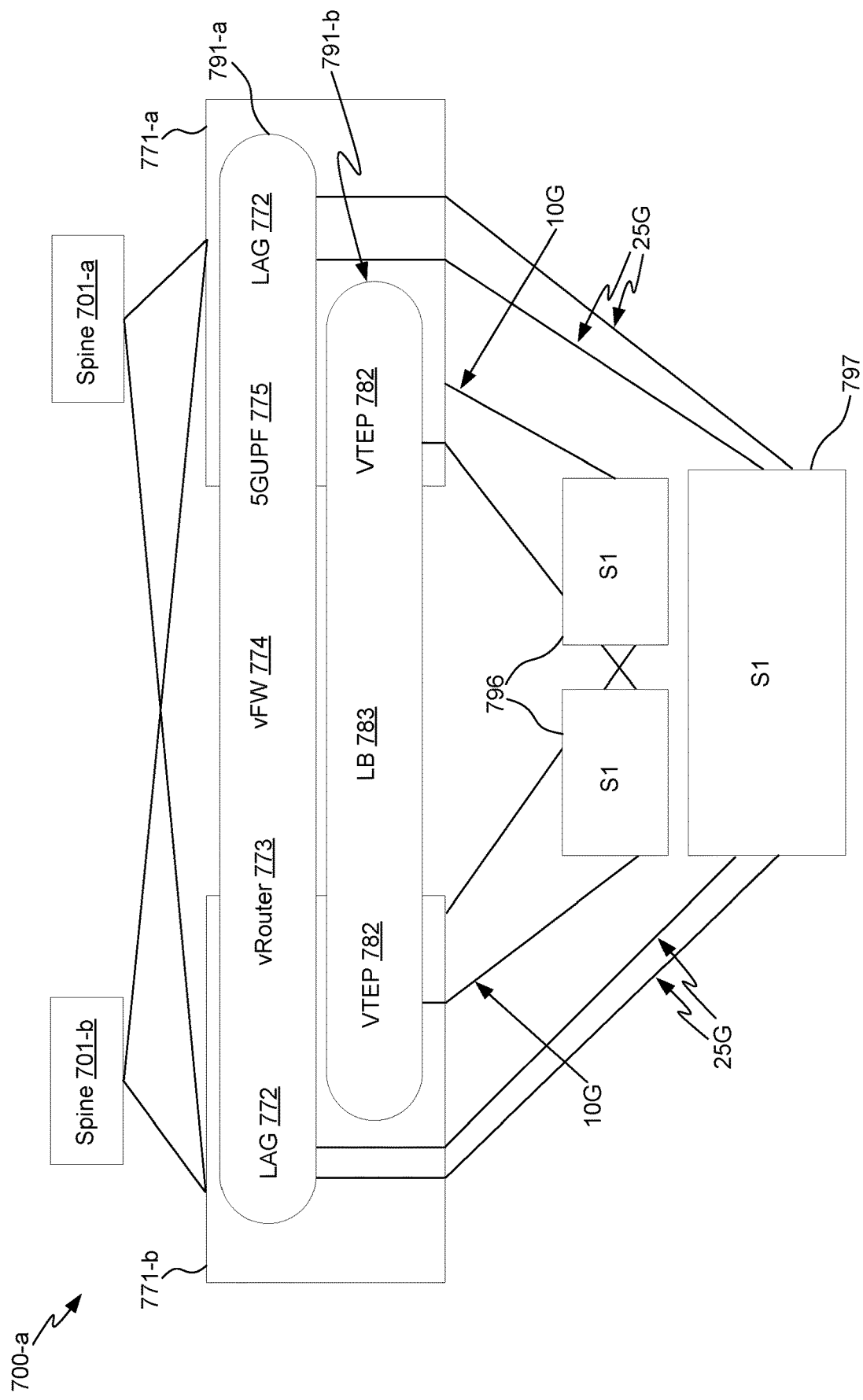
FIG. 7A illustrates a conceptual view of a virtual Top of Rack (vTOR) within a data center, according to various aspects of the disclosure.

FIG. 7A illustrates a conceptual view 700-*a* of virtual ToRs (vToRs) deployed within a data center, according to various aspects of the disclosure. As seen, the vTOR 700-*a* comprises first and second spines 701-*a*, 701-*b*, and first and second leaves 771-*a*, 771-*b*. FIG. 7A depicts an example of a multi-tiered spin-and-leaf topology, where each lower-tier switch (leaf layers 771-*a*, 771-*b*) is connected to each of the top-tier switches (spine layers 701-*a*, 701-*b*) in a full-mesh topology (i.e., where each spine is connected to each leaf). In this example, a first vTOR 791-*a* and a second vTOR 791-*b* are deployed at the leaf layer 771. Further, the first vTOR 791-*a* is configured to support link aggregation (LAG) 772, a virtual router (vRouter) 773, a virtual firewall (vFW) 774, and a 5G user plane function (UPF). The second vTOR 791-*b* comprises one or more VxLAN tunnel end points (VTEPs) 782 and a load balancer 783. As seen, each leaf 771 is connected to a plurality of computing devices, such as servers 796 and 797. Specifically, the vTORs 791-*a*, 791-*b* are each coupled to the server 797 using a plurality of links (labeled as 25G, which refers to a 25 gigabit ethernet link). In this example, the link aggregation performed by the LAG 772 is depicted by way of the two 25G links to the server 797. It should be noted that, the number of links is not intended to be limiting. For example, more than two links may be aggregated, in some embodiments, and the number of links aggregated by each LAG 772 may be based on the overall data-transfer rate desired (e.g., 10G, 25G, 50G, 100G, etc.).

In some cases, the vTOR 791-*b* is also connected to servers 796. Specifically, each VTEP 782 on each leaf 771 is connected to both the servers 796 over a 10G link. In some cases, a VTEP serves as a VxLAN encapsulation point and may be connected to a traffic source, such as a server or a virtual machine. The VTEP 782 may be part of the hypervisor (e.g., slicer visor abstraction layer) in a server platform, part of the network interface device in the server, or part of an attached top of rack (ToR) switch. In this example, the VTEPs 782 are part of a vTOR 791-*b*. In some examples, VTEPs are configured to perform encapsulation and de-encapsulation of packets in networks, such as, but not limited to overlay networks that encapsulate VxLAN transport frames as VxLAN packets. In some cases, VTEPs may be implemented in networks, such as overlay networks, as virtual bridges in a hypervisor server, VxLAN-specific virtual applications, or a switching hardware that is capable of handling VxLANs.

It should be noted that, other types of tunneling methods besides VxLAN may be supported by the vTORs described in this disclosure. For instance, a vTOR may support another type of tunneling method, such as Network Virtualization using Generic Routing Encapsulation (NVGRE) or Stateless Transport Tunneling (STT), to name two non-limiting examples. Broadly, these tunneling protocols (e.g., NVGRE, SST, VxLAN) are based on the notion of encapsulating a layer 2 (L2) MAC frame inside an internet protocol (IP) packet, and may be referred to as MAC-in-IP tunneling. In some instances, the hosts (e.g., servers, or other computing devices) involved in communicating with each other may be unaware that there is anything other than a traditional physical network between them. The hosts may construct and send packets in exactly the same manner as they would have, had there been no network virtualization involved. In this way, network virtualization resembles server virtualization, where hosts are unaware that they are actually running in a virtual machine environment. In some examples, any of the tunneling protocols described above may be used to form the tunnels that knit together the VTEPs in a software defined network (SDN) via a hypervisor-based overlay system, for instance.

Figure 7B:
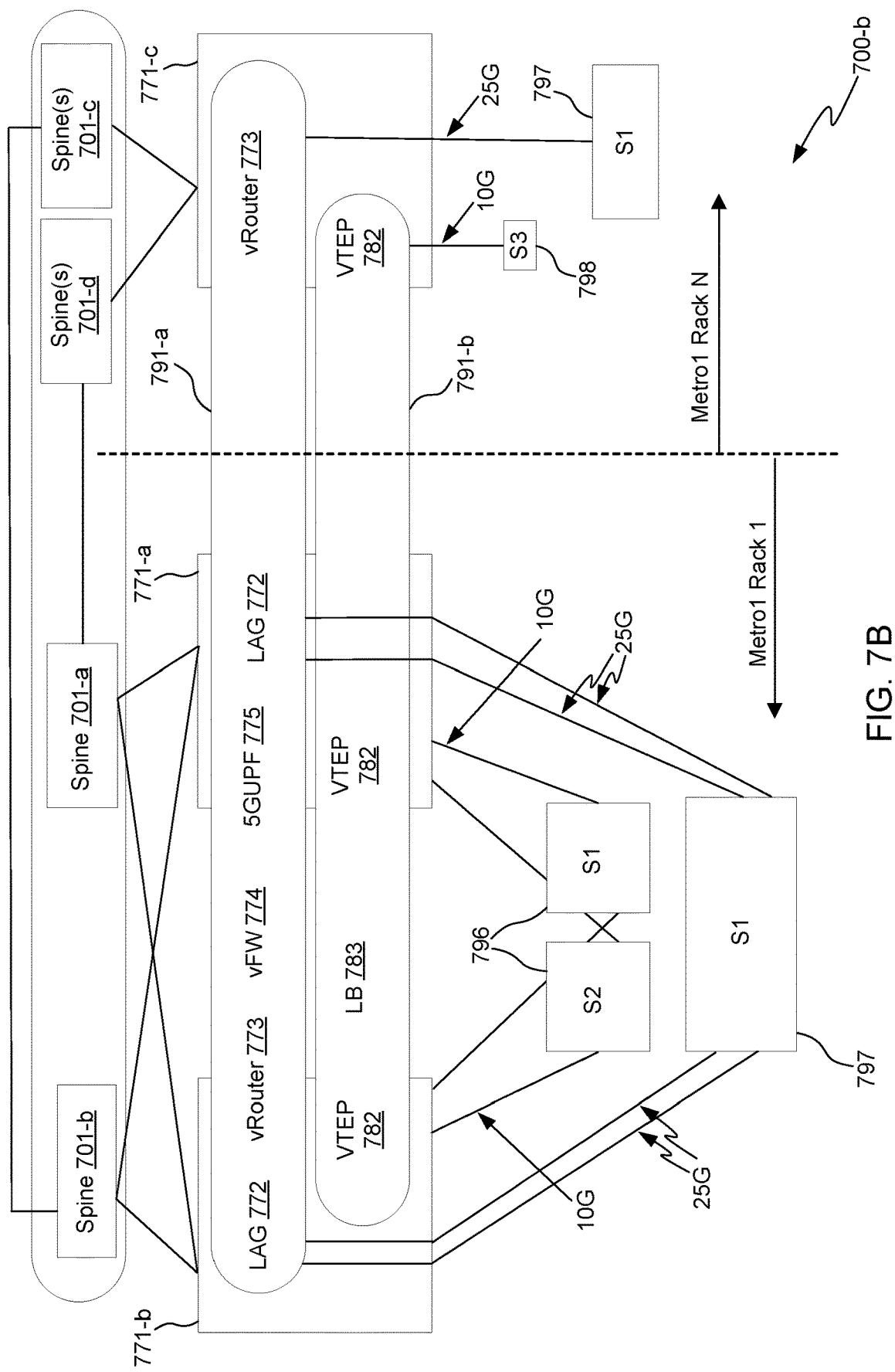
FIG. 7B illustrates a conceptual view of a metro vTOR, according to various aspects of the disclosure.

FIG. 7B illustrates a conceptual view 700-*b* of metro virtual ToRs (metro-vToRs), according to various aspects of the disclosure. In some examples, the metro-vToR described in relation to FIG. 7B implements one or more aspects of the vToRs described above in relation to FIG. 7A. As seen in FIG. 7B, aspects of the present disclosure enable physical fabric resources to be grouped (seamlessly by the control plane) into virtual constructs (could be hierarchical), such as a slice/vToR on a metro basis. In some cases, the illustration in FIG. 7B represents one non-limiting example of intra-metro distributed vTORs.

As seen, FIG. 7B depicts one or more metro racks (e.g., metro 1, Racks 1 through N, where N>1). Each metro rack comprises a plurality of spines 701 (e.g., spine 701-*a*, spine 701-*b*) and one or more leaves 771 (e.g., leaf 771-*a*, 771-*b*, 771-*c*). In this example, the first metro rack (i.e., metro 1, rack 1) comprises a first and second spine 701-*a* and 701-*b*, and a first and second leaf 771-*a* and 771-*b*, respectively. Further, the Nth metro rack (i.e., metro 1, rack N) comprises a first and second spine 701-*c* and 701-*d*, and a leaf 771-*c*. In some examples, the first and second spines of the first metro rack may be similar or substantially similar to the first and second spines of the Nth metro rack. Further, the first spine 701-*a* of the first metro rack may be electronically, logistically, and/or communicatively coupled to the first and second spines 701-*c*, 701-*d* of the Nth metro rack. Similarly, the second spine 701-*b* of the first metro rack may also be electronically, logistically, and/or communicatively coupled to the second spine 701-*d* of the Nth metro rack. In some cases, each spine 701 of a metro rack may be coupled to each leaf 771 of the metro rack (e.g., spine 701-*a* is coupled to leaf 771-*a* and leaf 771-*b*; spine 701-*c* and 701-*d* are coupled to leaf 771-*c*).

In this example, a first slice/vTOR 791-*a* and a second slice/vTOR 791-*b* are deployed on each of the N metro racks. The first slice/vTOR 791-*a* comprises one or more link aggregation (LAG) modules 772, a vRouter 773, a virtual firewall (vFW) 774, and a 5G user plane function (5G UPF) 775 in the first metro rack (i.e., metro 1, rack 1) and a vRouter 773 on the Nth metro rack (i.e., metro 1, rack N). Further, the second slice/vTOR 791-*b* comprises one or more VxLAN tunnel end points (VTEPs) 782 for each of the N racks and a load balancer (LB) 783 for at least one of the N racks. As an example, the first metro rack comprises two VTEPs 782 and a LB 783, while rack N comprises a single VTEP 782. It should be noted that, the number and/or location of the vRouter(s) 773, LAG(s) 772, vFW(s) 774, LB(s), and/or VTEP(s) 782 illustrated in FIG. 7B are exemplary only and not intended to be limiting. For instance, different vTOR types may be instantiated for meeting different networking requirements, such as, but not limited to, 5G traffic processing, storage, security, etc. In this example, the first slice/vTOR 791-*a* may be utilized for 5G traffic processing (e.g., slice type=5G, slice topology=data center or DC), while the second slice/vTOR 791-*b* may be utilized for storage (e.g., slice type=storage, slice topology=metro slice). In other cases, the first slice/vTOR 791-*a* comprises a metro slice topology.

In some cases, each slice/vTOR 791 may be connected to one or more servers/devices (e.g., S1, S2, S3). For example, the first slice/vTOR 791-*a* instantiated on the first leaf 771-*a* and the second leaf 771-*b* is connected to the server (S1) 797 via LAGs 772, while the second slice/vTOR 791-*b* instantiated on the first leaf 771-*a* and the second leaf 771-*b* is connected to each of the servers S2, S1 (or servers 796) via VTEPs 782. Similarly, the first slice/vTOR 791-*a* and the second slice/vTOR 791-*b* instantiated on the third leaf 771-*c* are connected to servers 797 (S1) and 798 (S3), respectively. Specifically, the connection between the first slice 791-*a* (on the third leaf 771-*c*) and the server 797 (S1) is achieved via the vRouter 773, while the VTEP 782 on the third leaf 771-*c* enables the connection between the second slice 791-*b* and the server 798 (S3). In this example, the first slice/vTOR 791-*a* is connected to the servers S1 and/or S3 via one or more 25G connections (e.g., a single 25G connection, one or more link-aggregated 25G connections), while the second slice 791-*b* is connected to the servers S1, S2, and/or S3 via one or more 10G connections.

Figure 8:
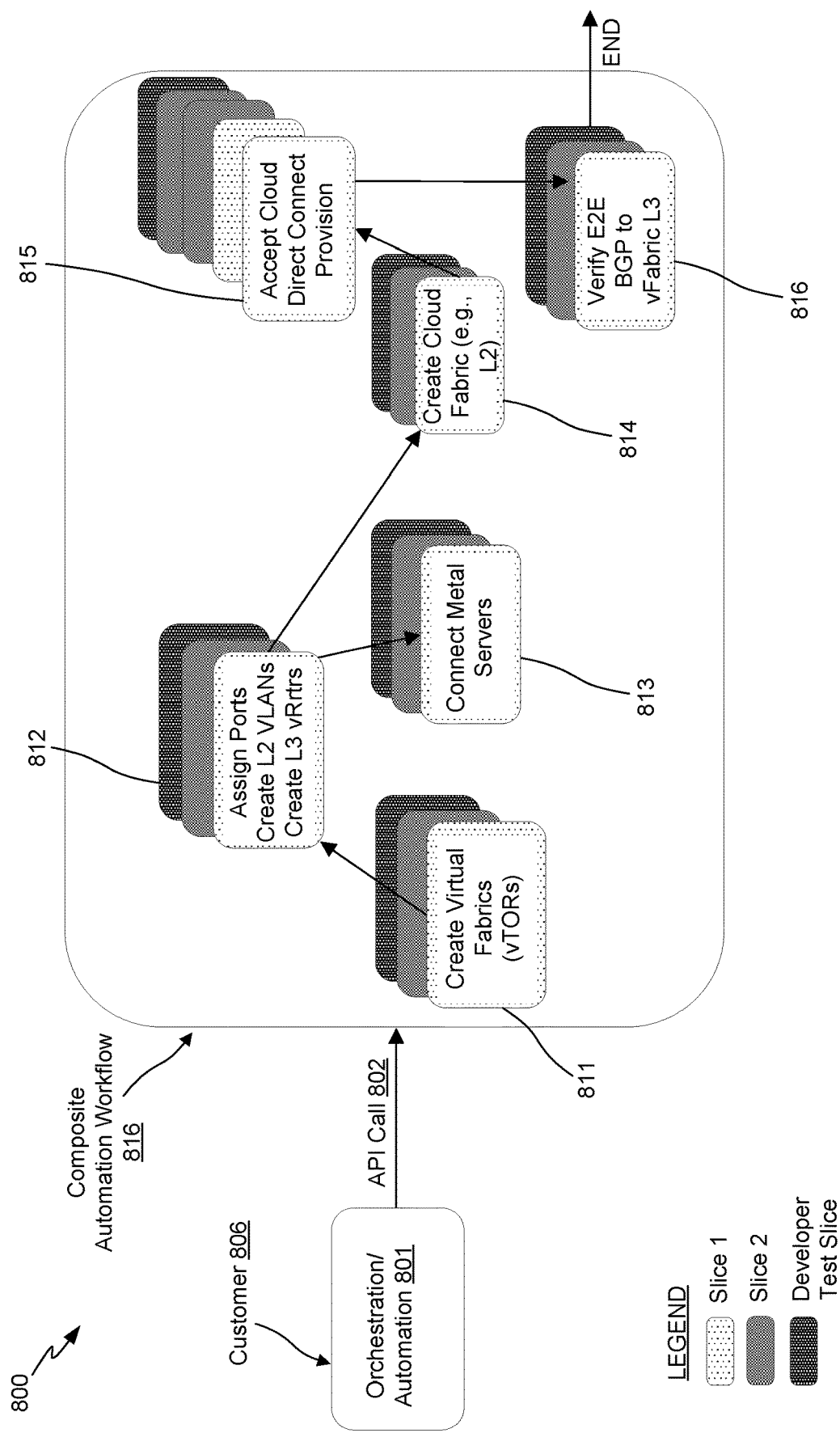
FIG. 8 illustrates an example of a process flow showing network development and operations with vTORs and network slicing, according to various aspects of the disclosure.

FIG. 8 illustrates an example of a process flow 800 showing network development and operations that may be supported via the use of vTORs and/or network slicing, in accordance with various aspects of the disclosure. In some examples, the disclosed vTORs/slicing may enable network developers (i.e., "dev ops") to upgrade software and/or load new features on a per-slice or vTOR basis. In some instances, this ability to upgrade software/load new features on a per slice basis may be referred to as network development and operations slicing, or simply, DevNetOps slicing. In some examples, DevNetOps slicing may be based on the slicer visor abstraction layer concept described above. In such cases, a network slice configured to support a vTOR may implement one or more aspects of a virtual machine (VM) on a server. In other words, the slice/vTOR may be configured to be upgraded, rebooted, etc. Additionally, or alternatively, a network slice or vTOR may be configured for independent operational and/or provisioning from other vTORs/slices. In some examples, a slice or vTOR may be configured such that it can be controlled (independently) from the master physical fabric. Furthermore, a user (e.g., administrator, network developer, dev ops programmer) can turn on independent features and/or data pipelines of a network slice or vTOR. In other cases, one or more features and/or data pipelines may be automatically turned on/off by the system (e.g., system 600) based on one or more attributes (e.g., slice type, slice topology, L2/L3 address spaces, VLAN or VxLAN identifiers, crypto signature, NAT, etc.) associated with the network slice.

As seen in FIG. 8, a customer 806 may begin an orchestration/automation operation (801) via an interface (e.g., user interface or UI, application programming interface or API) provided by the system. In one non-limiting example, the customer may make an API call 802 to the system, where the API call includes a request to configure one or more vTORs/network slices for the customer (e.g., create virtual fabrics/vTORs in the customer's metal deployment), perform a software upgrade, and/or load new features on a per-slice basis. In some cases, the system of the present disclosure is configured to perform the one or more steps depicted in the composite automation workflow 816 block.

Upon receiving the API call 802, the system is configured to create one or more virtual fabrics/vTORs/slices (operation 811). In this example, the system creates three slices, namely, slice 1, slice 2, and a developer test slice. At operation 812, the system assigns at least one port of the network switch hardware (e.g., ASIC 106) to each network slice, and creates one or more L2 VLANs and L3 virtual routers for the one or more network slices. In some cases, the system connects one or more "metal" servers (operation 813) based at least in part on assigning the ports and creating the L2 VLANs and/or L3 vRtrs for the one or more slices/vTORs (e.g., slice 1, slice 2, developer test slice).

Next, at operation 814, the system creates a cloud fabric (e.g., a L2 cloud fabric or cloud fabric supporting L2 connections), where the cloud fabric helps connect the customer's network to a cloud service. One non-limiting example of a cloud fabric may include the EQUINIX CLOUD EXCHANGE (ECX) FABRIC or the EQUINIX FABRIC provided by EQUINIX, INC., of Redwood, City, CA. It should be noted that, the cloud fabric listed herein is exemplary only and other types of cloud fabrics known and contemplated in the art may be utilized in different embodiments. In some cases, the cloud fabric (e.g., EQUINIX FABRIC) may help create L2 connections to various types of cloud services, such as, but not limited to, AMAZON WEB SERVICES DIRECT CONNECT (AWS DX) provided by Amazon, Inc., of Seattle, WA and/or AZURE EXPRESSROUTE (AZURE ER) provided by Microsoft, Corp., of Redmond, WA. In some examples, the cloud fabric created at operation 814 may also allow the customer/tenant 806 to interconnect their platform/service with multiple network, communication, security, and/or cloud providers (e.g., ALIBABA CLOUD, SALESFORCE, IBM Cloud, AZURE, AWS, ORACLE CLOUD, GOOGLE CLOUD, etc.). In some aspects, the cloud fabric supported by the present disclosure serves to enhance performance by providing reduced-latency private connections that may be run over a purpose-built layer 2 (L2) network. Further, the cloud fabric (e.g., ECX or EQUINIX FABRIC) may allow the customer to bypass the public internet, which serves to reduce cyber security threats, in some examples.

As used herein, "Border Gateway Protocol" or "BGP" refers to a standardized exterior gateway protocol that enables the exchange of routing and/or reliability information between autonomous systems (AS) on the internet. In some aspects, BGP serves as the routing protocol for the internet as it is the protocol underlying the global routing system of the internet. As networks interact with each other, they need a way to communicate, which may be accomplished through peering. In some cases, BGP helps make peering possible. In some examples, operation 815 comprises accepting a BGP provisioned by a cloud service provider (e.g., AWS DX Provision BGP). In some cases, a BGP service may be added to the cloud fabric L2 connection, which allows the customer/tenant's device or network to peer with the equivalent settings (i.e., BGP settings) on the other side of the connection (e.g., connection to the cloud service provider, such as AWS). In some cases, BGP settings may be added to a connection associated with a device once the connection is up and running.

In some cases, operation 816 comprises verifying an end-to-end (E2E) BGP to a virtual fabric (e.g., a layer 3 or L3 vFabric).

Figure 9:
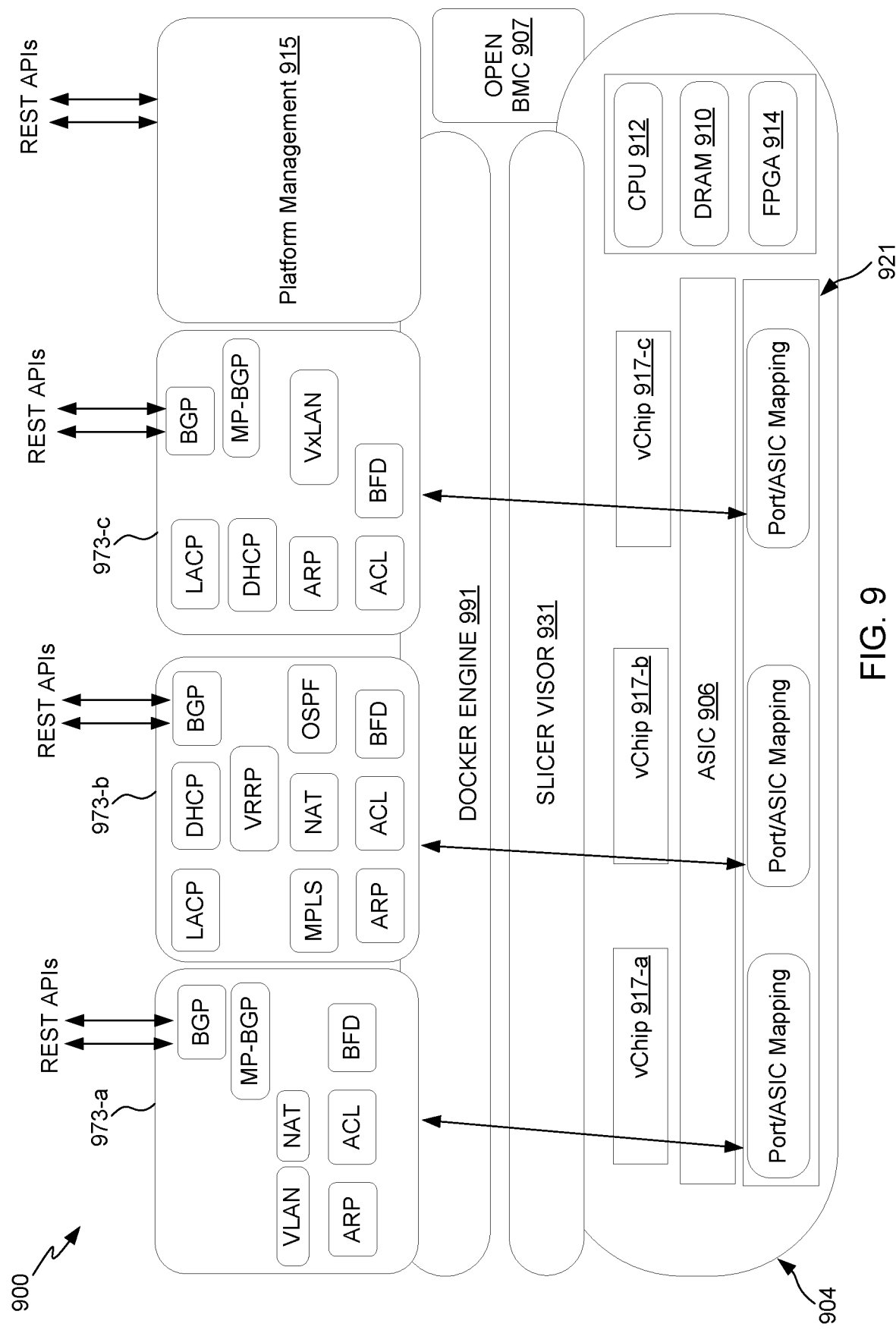
FIG. 9 illustrates a schematic view of virtual routers (vRouters) configured for direct programming control via one or more application programming interfaces (APIs), according to various aspects of the disclosure.

FIG. 9 illustrates a schematic diagram 900 depicting virtual routers 973 configured for direct programming control via APIs, according to various aspects of the disclosure. The virtual routers 9731 may implement one or more aspects of the network slices described above. In some cases, the control components of a network function may be implemented in containers (e.g., LINUX containers) and scaled/managed (as needed) by container management systems, such as Kubernetes. As seen, FIG. 9 depicts a plurality of virtual routers 973 (e.g., virtual routers 973-*a*, 973-*b*, 973-*c*), where each virtual router is associated with a different vendor. Each virtual router (or vRtr) implements one or more protocols, rules, layers, etc., such as Border Gateway Protocol (BGP), Multiprotocol BGP (MP-BGP), VLAN, NAT, Access Control List (ACL), Bidirectional Forward Detection (BFD), Open Shortest Path First (OSPF), Virtual Router Redundancy Protocol (VRRP), Multiprotocol Label Switching (MPLS), VxLAN, Dynamic Host Configuration Protocol (DHCP), Link Aggregation Control Protocol (LACP), and/or Address Resolution Protocol (ARP), to name a few non-limiting examples. One or more of the protocols, rules, layers, and/or techniques depicted within the virtual routers may be optional. In other words, the illustration in FIG. 9 is exemplary only and not intended to limit the scope of the disclosure.

In some embodiments, aspects of the present disclosure support the use of disaggregated Cloud Native Network Functions (CNFs) and a slicer visor abstraction layer 931, where the slicer visor layer 931 is used to managed data-plane pipelines for implementing virtual routers 973. The virtual routers 973 may be configured for direct programmatic control via APIs, such as REST APIs, where the control may be provided on a per virtual router basis. In some instances, in the context of networks, disaggregation may refer to the separation between networking hardware (e.g., ASIC 906) and operating software. Furthermore, in the context of virtual networking, disaggregation may also comprise the separation of software stacks responsible for control and signaling tasks and those used for traffic forwarding. In some examples, disaggregated CNFs may allow the data-plane component(s) to be offloaded to the networking hardware, such as the switching ASIC 906. In some other cases, for instance, when disaggregated CNFs are combined with programmable data-plane pipelines, a variety of network functions may be instantiated at the control plane layer (e.g., as Containers or Kubernetes pods, to name two non-limiting examples). Further, the data-plane processing may be offloaded to the programmable data-plane as a sequence or combination of processing steps.

In the example shown, the slicer visor 931 is used to manage the programmable data-plane pipeline, as previously described in relation to the figures above, including at least FIGS. 4-6. The docker engine 991, which may be an example of a containerization platform, is configured to deliver software in packages/containers. Further, the virtual routers 973 may be run in the containers (e.g., LINUX containers) provided by the docker engine 991. In other words, the docker engine 991 is configured to bundle up one or more application dependencies inside one or more containers (e.g., one container for each virtual router), where the containers are run/executed on the docker engine 991. In some cases, the slicer visor 931 is similar or substantially similar to the slicer visor 331 in FIGS. 3, 4, and is configured to construct one or more virtual chips (vChips) 917. For example, the slicer visor 931 constructs a plurality of vChips 917-*a*, 917-*b*, 917-*c*, where each vChip exposes one or more of vTCAM, vCPU, vFPGA, and/or data-plane pipelines. As seen, the vChips 917 may be used to run network software, such as containerized implementations of virtual routers 973. Further, each of the virtual routers 973 and vChips 917 is mapped to a port/interface 921 of the hardware platform 904. Besides the ASIC 906, the hardware platform 904 further includes one or more of a CPU 912, DRAM 910, and FPGA 914. In some embodiments, a platform management module 915 is provided to manage the one or more elements (e.g., virtual routers, docker engine, etc.) of the system, where the platform management module 915 may be controlled using an API (e.g., REST APIs). In some aspects, the platform management module 915 serves as a functional configuration manager that is utilized to setup/provision functions with a "slice like" router configuration. In some embodiments, the platform management module 915 implements one or more aspects of the slice context manager described above in relation to FIG. 6. Additionally, or alternatively, the system in FIG. 9 utilizes a baseboard management controller (BMC) for managing the interface between the platform management module 915 and the switching hardware. The BMC may be embodied in hardware, software, or a combination thereof.

For example, the BMC may comprise a specialized microcontroller embedded on the motherboard of a computer, such as a server. While not necessary, in some implementations, the BMC may comprise dedicated firmware and RAM for performing its functions. In one non-limiting example, an open-source implementation of the BMC firmware stack, herein referred to as OpenBMC 907, may be utilized.

Figure 10:
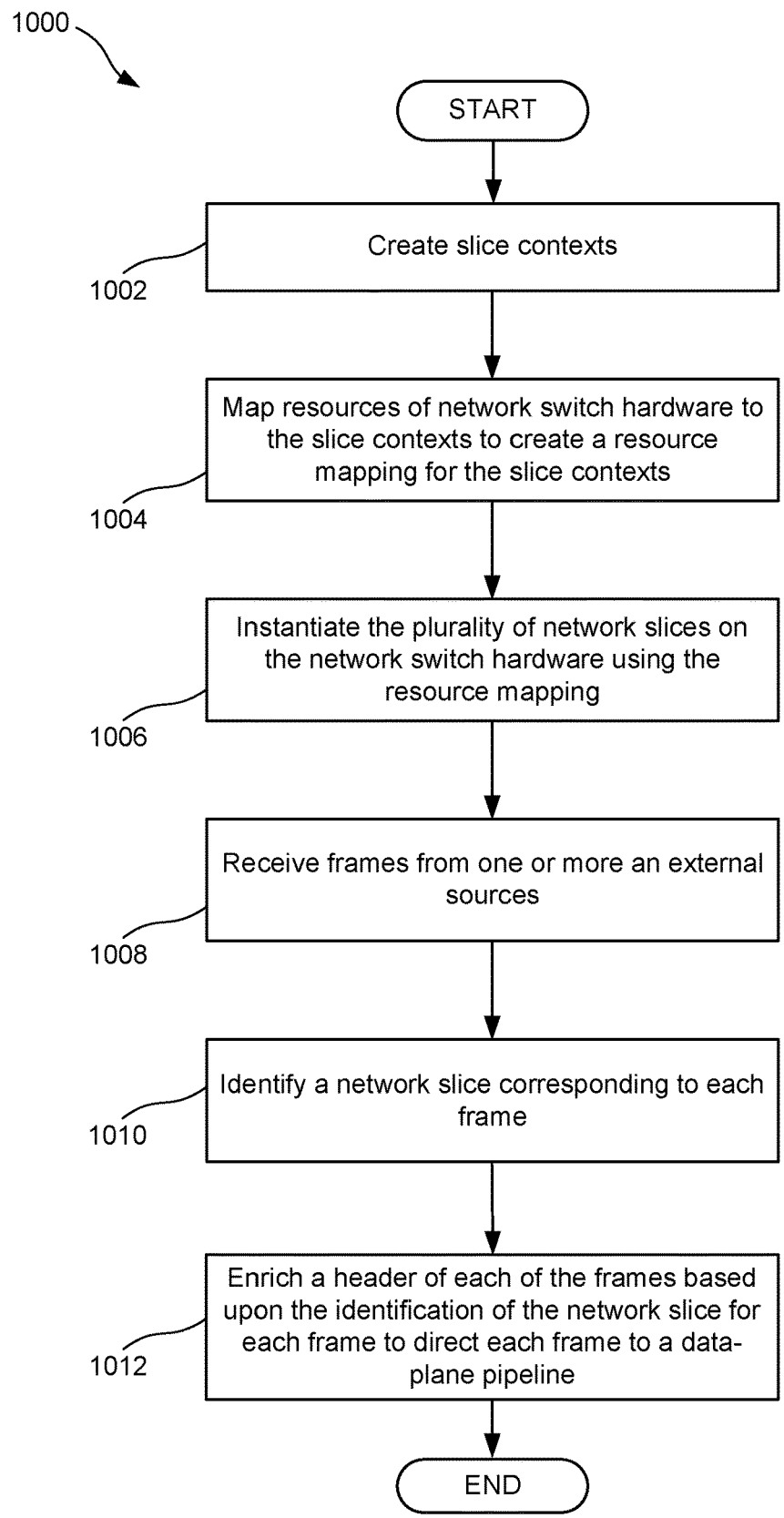
FIG. 10 illustrates an example of a method for network slicing with virtualized programmable data-plane pipelines, according to various aspects of the disclosure.

FIG. 10 illustrates a method 1000 for network slicing with virtualized programmable data-plane pipelines, according to various aspects of the disclosure. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

A first operation 1002 may include creating slice contexts, wherein creating the slice contexts comprises (1) creating control-plane data for each of a plurality of network slices, (2) creating data-plane data for each of the plurality of network slices, and (3) storing the control-plane data and the data-plane data for each of the plurality of network slices to produce slice contexts. First operation 1002 may be performed by one or more hardware processors configured by machine-readable instructions including a module that is the same as or similar to external control plane interface module 615, data plane pipeline repository module 635, slice context manager 605, and/or slicer visor manager 615, in accordance with one or more implementations.

A second operation 1004 may include mapping resources of network switch hardware to the slice contexts to create a resource mapping for the slice contexts. Second operation 1002 may be performed by one or more hardware processors configured by machine-readable instructions including a module that is the same as or similar to topology manager 630, data plane pipeline repository module 635, slice context manager 605, and/or slicer visor manager 615, in accordance with one or more implementations.

Third operation 1006 may include instantiating the plurality of network slices on the network switch hardware using the resource mapping. Third operation 1006 may be performed by one or more hardware processors configured by machine-readable instructions including a module that is the same as or similar to slice context manager 605, and/or slicer visor manager 615, in accordance with one or more implementations.

Fourth operation 1008 may include receiving frames from one or more an external sources. Fourth operation 1008 may be performed by one or more hardware processors configured by machine-readable instructions including a module that is the same as or similar to UI/API module 699, and/or slicer visor manager 615, in accordance with one or more implementations.

Fifth operation 1010 may include identifying a network slice corresponding to each frame. Fifth operation 1010 may be performed by one or more hardware processors configured by machine-readable instructions including a module that is the same as or similar to slicer visor manager 615, in accordance with one or more implementations.

Sixth operation 1012 may include enriching a header of each of the frames based upon the identification of the network slice for each frame to direct each frame to a data-plane pipeline. Sixth operation 1012 may be performed by one or more hardware processors configured by machine-readable instructions including a module that is the same as or similar to slice context manager 605 and/or slicer visor manager 615, in accordance with one or more implementations.

Figure 11:
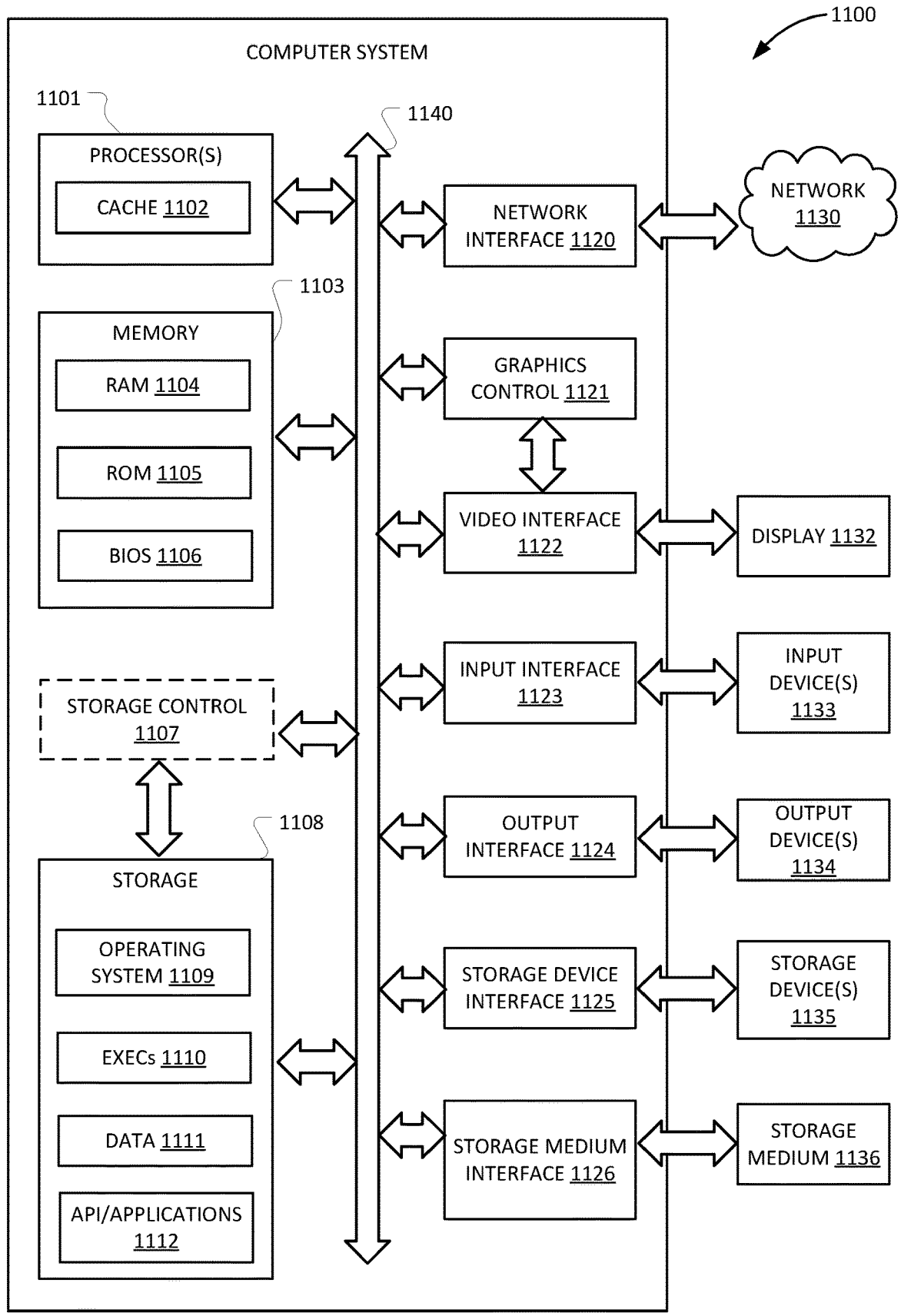
FIG. 11 is a block diagram depicting an exemplary machine that includes a computer system within which a set of instructions can be executed for causing a device to perform or execute any one or more of the aspects and/or methodologies of the present disclosure.

FIG. 11 illustrates a diagrammatic representation of one embodiment of a computer system 1100, within which a set of instructions can execute for causing a device to perform or execute any one or more of the aspects and/or methodologies of the present disclosure. The components in FIG. 11 are examples only and do not limit the scope of use or functionality of any hardware, software, firmware, embedded logic component, or a combination of two or more such components implementing particular embodiments of this disclosure. Some or all of the illustrated components can be part of the computer system 1100. For instance, the computer system 1100 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 1100 includes at least a processor 1101 such as a central processing unit (CPU) or a graphics processing unit (GPU) to name two non-limiting examples. Any of the subsystems described throughout this disclosure could embody the processor 1101. The computer system 1100 may also comprise a memory 1103 and a storage 1108, both communicating with each other, and with other components, via a bus 1140. The bus 1140 may also link a display 1132, one or more input devices 1133 (which may, for example, include a keypad, a keyboard, a mouse, a stylus, etc.), one or more output devices 1134, one or more storage devices 1135, and various non-transitory, tangible computer-readable storage media 1136 with each other and/or with one or more of the processor 1101, the memory 1103, and the storage 1108. All of these elements may interface directly or via one or more interfaces or adaptors to the bus 1140. For instance, the various non-transitory, tangible computer-readable storage media 1136 can interface with the bus 1140 via storage medium interface 1126. Computer system 1100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1101 (or central processing unit(s) (CPU(s))) optionally contains a cache memory unit 1132 for temporary local storage of instructions, data, or computer addresses. Processor(s) 1101 are configured to assist in execution of computer-readable instructions stored on at least one non-transitory, tangible computer-readable storage medium. Computer system 1100 may provide functionality as a result of the processor(s) 1101 executing software embodied in one or more non-transitory, tangible computer-readable storage media, such as memory 1103, storage 1108, storage devices 1135, and/or storage medium 1136 (e.g., read only memory (ROM)). Memory 1103 may read the software from one or more other non-transitory, tangible computer-readable storage media (such as mass storage device(s) 1135, 1136) or from one or more other sources through a suitable interface, such as network interface 1120. Any of the subsystems herein disclosed could include a network interface such as the network interface 1120. The software may cause processor(s) 1101 to carry out one or more processes or one or more steps of one or more processes described or illustrated herein. Carrying out such processes or steps may include defining data structures stored in memory 1103 and modifying the data structures as directed by the software. In some embodiments, an FPGA can store instructions for carrying out functionality as described in this disclosure. In other embodiments, firmware includes instructions for carrying out functionality as described in this disclosure.

The memory 1103 may include various components (e.g., non-transitory, tangible computer-readable storage media) including, but not limited to, a random-access memory component (e.g., RAM 1104) (e.g., a static RAM "SRAM", a dynamic RAM "DRAM, etc.), a read-only component (e.g., ROM 1104), and any combinations thereof. ROM 1104 may act to communicate data and instructions unidirectionally to processor(s) 1101, and RAM 1104 may act to communicate data and instructions bidirectionally with processor(s) 1101. ROM 1104 and RAM 1104 may include any suitable non-transitory, tangible computer-readable storage media. In some instances, ROM 1104 and RAM 1104 include non-transitory, tangible computer-readable storage media for carrying out a method. In one example, a basic input/output system 1106 (BIOS), including basic routines that help to transfer information between elements within computer system 1100, such as during start-up, may be stored in the memory 1103.

Fixed storage 1108 is connected bi-directionally to processor(s) 1101, optionally through storage control unit 1107. Fixed storage 1108 provides additional data storage capacity and may also include any suitable non-transitory, tangible computer-readable media described herein. Storage 1108 may be used to store operating system 1104, EXEC s 1110 (executables), data 1111, API applications 1112 (application programs), and the like. Often, although not always, storage 1108 is a secondary storage medium (such as a hard disk) that is slower than primary storage (e.g., memory 1103). Storage 1108 can also include an optical disk drive, a solid-state memory device (e.g., flash-based systems), or a combination of any of the above. Information in storage 1108 may, in appropriate cases, be incorporated as virtual memory in memory 1103.

In one example, storage device(s) 1135 may be removably interfaced with computer system 1100 (e.g., via an external port connector (not shown)) via a storage device interface 1125. Particularly, storage device(s) 1135 and an associated machine-readable medium may provide nonvolatile and/or volatile storage of machine-readable instructions, data structures, program modules, and/or other data for the computer system 1100. In one example, software may reside, completely or partially, within a machine-readable medium on storage device(s) 1135. In another example, software may reside, completely or partially, within processor(s) 1101.

Bus 1140 connects a wide variety of subsystems. Herein, reference to a bus may encompass one or more digital signal lines serving a common function, where appropriate. Bus 1140 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1100 may also include an input device 1133. In one example, a user of computer system 1100 may enter commands and/or other information into computer system 1100 via input device(s) 1133. Examples of an input device(s) 1133 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 1133 may be interfaced to bus 1140 via any of a variety of input interfaces 1123 (e.g., input interface 1123) including, but not limited to, serial, parallel, game port, USB, FIREWIRE, THUNDERBOLT, or any combination of the above.

In particular embodiments, when computer system 1100 is connected to network 1130, computer system 1100 may communicate with other devices, such as mobile devices and enterprise systems, connected to network 1130. Communications to and from computer system 1100 may be sent through network interface 1120. For example, network interface 1120 may receive incoming communications (such as requests or responses from other devices) in the form of one or more packets (such as Internet Protocol (IP) packets) from network 1130, and computer system 1100 may store the incoming communications in memory 1103 for processing. Computer system 1100 may similarly store outgoing communications (such as requests or responses to other devices) in the form of one or more packets in memory 1103 and communicated to network 1130 from network interface 1120. Processor(s) 1101 may access these communication packets stored in memory 1103 for processing.

Examples of the network interface 1120 include, but are not limited to, a network interface card, a modem, and any combination thereof. Examples of a network 1130 or network segment 1130 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1130, may employ a wired and/or a wireless mode of communication. In general, any network topology may be used.

Information and data can be displayed through a display 1132. Examples of a display 1132 include, but are not limited to, a liquid crystal display (LCD), an organic liquid crystal display (OLED), a cathode ray tube (CRT), a plasma display, and any combinations thereof. The display 1132 can interface to the processor(s) 1101, memory 1103, and fixed storage 1108, as well as other devices, such as input device(s) 1133, via the bus 1140. The display 1132 is linked to the bus 1140 via a video interface 1122, and transport of data between the display 1132 and the bus 1140 can be controlled via the graphics control 1121.

In addition to a display 1132, computer system 1100 may include one or more other peripheral output devices 1134 including, but not limited to, an audio speaker, a printer, a check or receipt printer, and any combinations thereof. Such peripheral output devices may be connected to the bus 1140 via an output interface 1124. Examples of an output interface 1124 include, but are not limited to, a serial port, a parallel connection, a USB port, a FIREWIRE port, a THUNDERBOLT port, and any combinations thereof.

In addition, or as an alternative, computer system 1100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1100 shown in FIG. 11 such as, but not limited to, the network 1130, processor 1101, memory, 1103, etc., may comprise a cloud computing system. In one such system, front-end systems such as input devices 1133 may provide information to back-end platforms such as servers (e.g., computer systems 1100) and storage (e.g., memory 1103). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for network slicing with programmable data-plane pipelines, the method comprising:
    creating slice contexts, wherein creating the slice contexts comprises:
        creating control-plane data for each of a plurality of network slices;
        creating data-plane data for each of the plurality of network slices; and
        storing the control-plane data and the data-plane data for each of the plurality of network slices to produce slice contexts;
    mapping resources of network switch hardware to the slice contexts to create a resource mapping for the slice contexts;
    instantiating the plurality of network slices on the network switch hardware using the resource mapping;
    receiving frames from one or more external sources;
    identifying a network slice corresponding to each frame; and
    enriching a header of each of the frames, based upon the identification of the network slice for each frame, to direct each frame to a data-plane pipeline.

2. The method of claim 1, wherein the mapping of resources comprises allocating resources utilizing direct partitioning of network switch hardware.

3. The method of claim 1, wherein the mapping of resources comprises allocating resources utilizing a slicer visor abstraction layer.

4. The method of claim 1, wherein the mapping of resources comprises tailoring the mapping to specific network switch hardware based upon specified requirements.

5. The method of claim 1 comprising:
    receiving network slice requirements from a 5G control plane;
    wherein the creation of control-plane data and data-plane data is based upon the network slice requirements received from the 5G control plane to create a slice context defined by the 5G control plane.

6. The method of claim 1, wherein the creation of control-plane data and data-plane data produces a slice context with capabilities beyond a 5G network.

7. The method of claim 1 wherein the instantiating the plurality of network slices on the network switch hardware comprises programming the network switch hardware based upon a type of slice defined by the data-plane data; wherein the method comprises:
    triggering packet processing actions based on slice types.

8. The method of claim 1 wherein each of the data-plane pipelines comprises a slice-specific data-plane processing pipeline, and wherein each slice context is associated with a data plane program corresponding to one or more network slice requirements for a respective network slice.

9. The method of claim 8, wherein the one or more network slice requirements comprise one or more of security, 5G traffic processing, 5G capability, 5G proximity to access networks, and storage.

10. A system configured for network slicing with programmable data-plane pipelines, comprising:
    network switch hardware;
    one or more hardware processors configured by machine-readable instructions to:
        create slice contexts, wherein creating the slice contexts comprises:
            create control-plane data for each of a plurality of network slices;
            create data-plane data for each of the plurality of network slices; and
            store the control-plane data and the data-plane data for each of the plurality of network slices to produce slice contexts;
        map resources of the network switch hardware to the slice contexts to create a resource mapping for the slice contexts;
        instantiate the plurality of network slices on the network switch hardware using the resource mapping;
        receive frames from one or more external sources;
        identify a network slice corresponding to each frame; and
        enrich a header of each of the frames, based upon the identification of the network slice for each frame, to direct each frame to a data-plane pipeline.

11. The system of claim 10, wherein the mapping of resources comprises allocating resources utilizing direct partitioning of network switch hardware.

12. The system of claim 10, wherein the mapping of resources comprises allocating resources utilizing a slicer visor abstraction layer.

13. The system of claim 10, wherein the mapping of resources comprises tailoring the mapping to specific network switch hardware based upon specified requirements.

14. The system of claim 10, wherein the one or more hardware processors are further configured by machine-readable instructions to:
    receive network slice requirements from a 5G control plane;
    and wherein the creation of control-plane data and data-plane data is based upon the network slice requirements received from the 5G control plane to create a slice context defined by the 5G control plane.

15. The system of claim 10, wherein the creation of control-plane data and data-plane data produces a slice context with capabilities beyond a 5G network.

16. The system of claim 10, wherein the instantiating the plurality of network slices on the network switch hardware comprises programming the network switch hardware based upon a type of slice defined by the data-plane data;
    and wherein the one or more hardware processors are further configured by machine-readable instructions to:
    trigger packet processing actions based on slice types.

17. The system of claim 10, wherein each of the data-plane pipelines comprises a slice-specific data-plane processing pipeline, and wherein each slice context is associated with a data plane program corresponding to one or more network slice requirements for a respective network slice.

18. The system of claim 17, wherein the one or more network slice requirements comprise one or more of security, 5G traffic processing, 5G capability, 5G proximity to access networks, and storage.

19. A non-transitory, tangible processor readable storage medium, encoded with processor readable instructions to perform a method for network slicing with programmable data-plane pipelines, the method comprising:
 creating slice contexts, wherein creating the slice contexts comprises:
  creating control-plane data for each of a plurality of network slices;
  creating data-plane data for each of the plurality of network slices; and
  storing the control-plane data and the data-plane data for each of the plurality of network slices to produce slice contexts;
 mapping resources of network switch hardware to the slice contexts to create a resource mapping for the slice contexts;
 instantiating the plurality of network slices on the network switch hardware using the resource mapping;
 receiving frames from one or more external sources;
 identifying a network slice corresponding to each frame; and
 enriching a header of each of the frames, based upon the identification of the network slice for each frame, to direct each frame to a data-plane pipeline.

20. The non-transitory computer-readable storage medium of claim 19, wherein,
 each of the data-plane pipelines comprises a slice-specific data-plane processing pipeline,
 each slice context is associated with a data plane program corresponding to one or more network slice requirements for a respective network slice, and
 the one or more network slice requirements comprise one or more of security, 5G traffic processing, 5G capability, 5G proximity to access networks, and storage.

* * * * *